US006253232B1

(12) United States Patent
Ito et al.

(10) Patent No.: US 6,253,232 B1
(45) Date of Patent: *Jun. 26, 2001

(54) DATA PROCESSING CONTROL DEVICE AND METHOD OF SAME

(75) Inventors: Norikazu Ito; Tsutomu Yamamoto; Taro Shigata; Shintaro Mizutani; Yusuke Tani; Ichiro Fujisawa, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,643

(22) Filed: Mar. 24, 1997

(30) Foreign Application Priority Data

Mar. 29, 1996 (JP) .............................................. P08-077836

(51) Int. Cl.⁷ ........................... G06F 15/16; G06F 15/173
(52) U.S. Cl. ............................................. 709/208; 709/223
(58) Field of Search ........................ 340/825.24, 825.25; 395/200.53, 200.54, 200.55, 200.56, 200.38, 200.41; 709/223, 224, 225, 226, 208, 211

(56) References Cited

U.S. PATENT DOCUMENTS

| 4,855,730 | * | 8/1989 | Venners et al. ................. 340/825.24 |
| 5,140,419 | * | 8/1992 | Galumbeck et al. ........... 340/825.44 |
| 5,170,252 | * | 12/1992 | Gear et al. ........................... 358/181 |
| 5,296,848 | * | 3/1994 | Witheridge et al. ............ 340/825.04 |
| 5,452,291 | * | 9/1995 | Eisenhandler et al. ................ 370/64 |
| 5,487,167 | * | 1/1996 | Dinallo et al. ....................... 395/650 |
| 5,598,278 | * | 1/1997 | Tanaka et al. ......................... 386/96 |
| 5,680,639 | * | 10/1997 | Milne et al. .......................... 395/806 |
| 5,712,834 | * | 1/1998 | Nagano et al. ........................ 369/19 |
| 5,740,384 | * | 4/1998 | Asthana et al. ...................... 395/306 |
| 5,787,259 | * | 7/1998 | Haroun et al. ....................... 709/253 |
| 5,802,300 | * | 9/1998 | Tanaka et al. .................. 395/200.52 |

OTHER PUBLICATIONS

Microsoft Press Computer Dictionary, 2nd ed.; ISBN 1–55615–597–2, 1993.*

* cited by examiner

Primary Examiner—Mark H. Rinehart
Assistant Examiner—Marc D. Thompson
(74) Attorney, Agent, or Firm—Frommer Lawrence & Haug, LLP.; William S. Frommer; Joe H. Shallenburger

(57) ABSTRACT

A control command attaching the same identifier to related commands is input from an application to an AV data processing control device. Further, a command for linking this identifier and a trigger generated by a contact input-1 is input. When the contact input-1 is generated, all control commands containing the identifier are executed. Further, when the link of the contact input-1 and the identifier of the control command is invalidated, even if the contact input-1 is generated, none of the linked control commands are executed. The execution of the control commands is carried out by controlling the controlled devices by the IDCs.

24 Claims, 21 Drawing Sheets

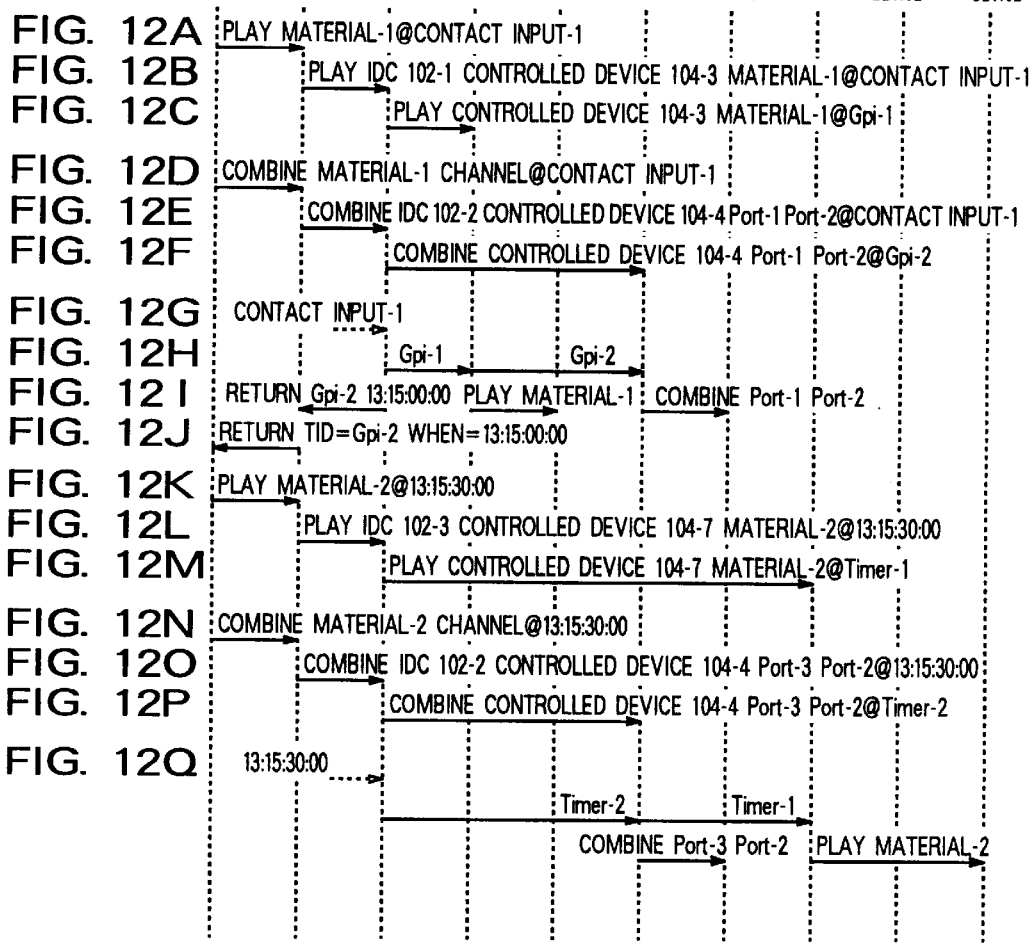

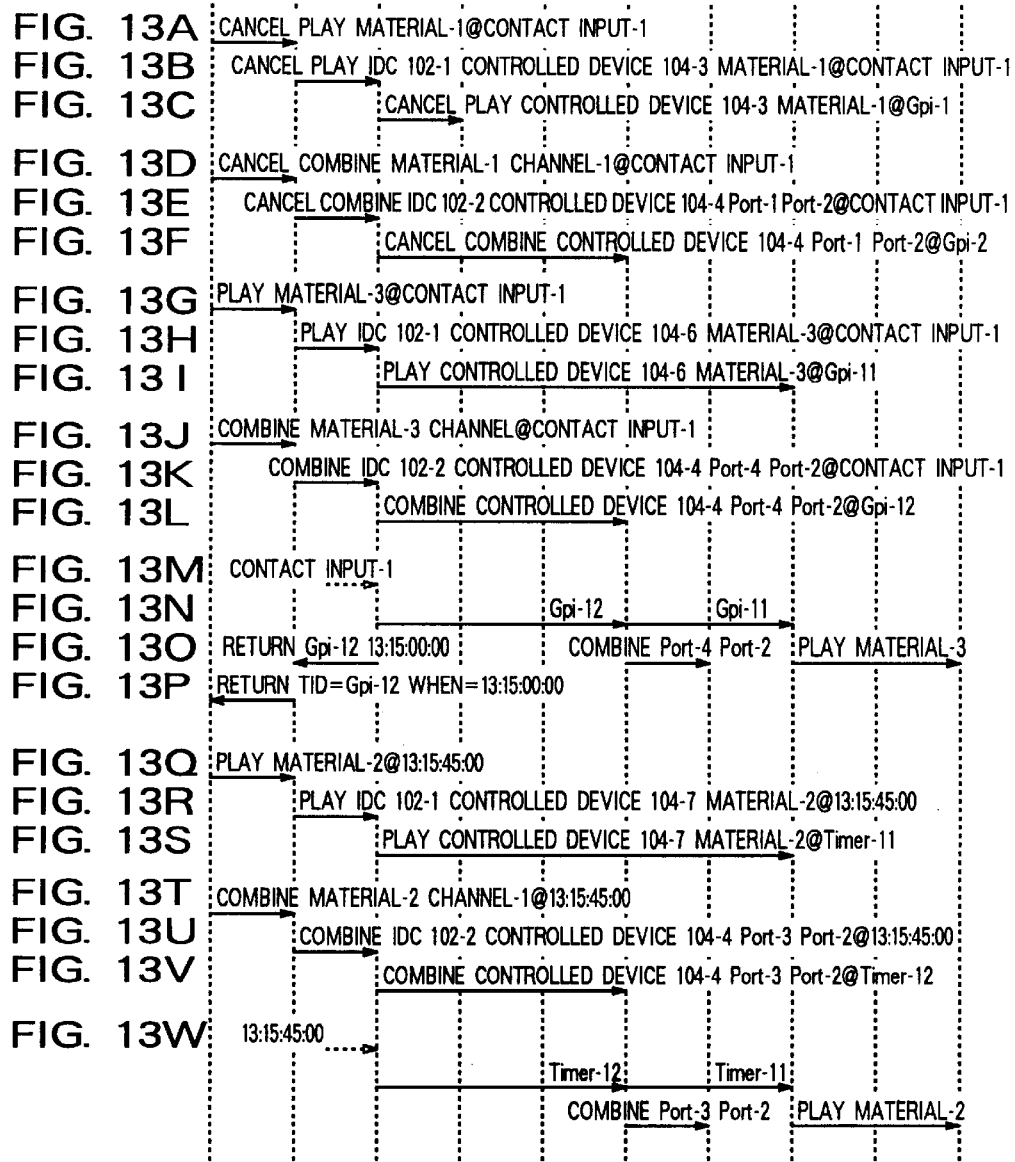

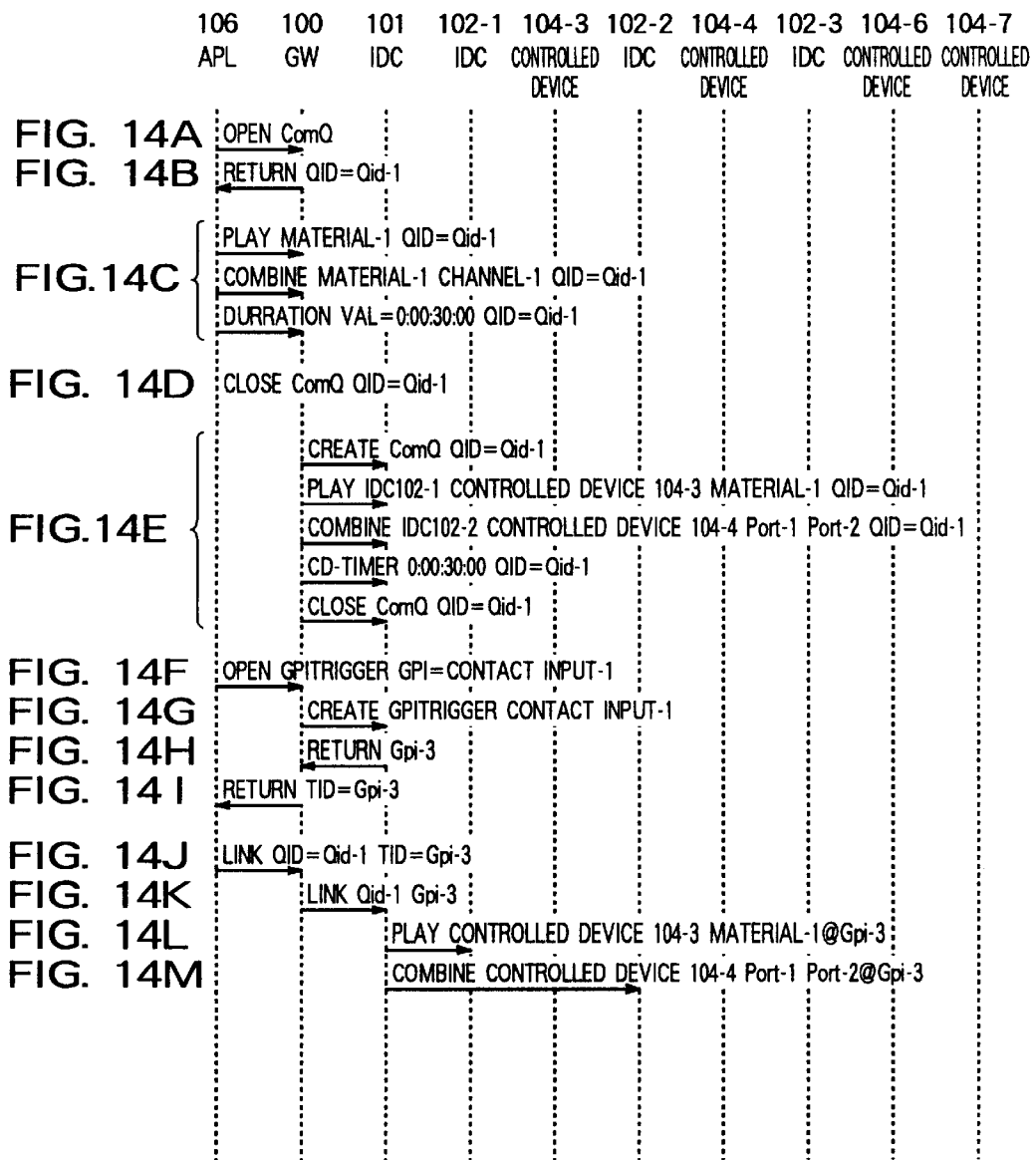

|     | 106 | 100 | 101 | 102-1 | 104-3 | 102-2 | 104-4 | 102-3 | 104-6 | 104-7 |
|---|---|---|---|---|---|---|---|---|---|---|
|     | APL | GW  | IDC | IDC   | CONTROLLED DEVICE | IDC | CONTROLLED DEVICE | IDC | CONTROLLED DEVICE | CONTROLLED DEVICE |

FIG. 15A — OPEN ComQ

FIG. 15B — RETURN QID=Qid-2

FIG. 15C
- PLAY MATERIAL-2 QID=Qid-2
- COMBINE MATERIAL-2 CHANNEL-1 QID=Qid-2
- DURRATION VAL=0:00:50:00 QID=Qid-2

FIG. 15D — CLOSE ComQ QID=Qid-2

FIG. 15E
- CREATE ComQ QID=Qid-2
- PLAY IDC102-1 CONTROLLED DEVICE 104-7 MATERIAL-2 QID=Qid-2
- COMBINE IDC102-2 CONTROLLED DEVICE 104-4 Port-3 Port-2 QID=Qid-2
- CD-TIMER 0:00:50:00 QID=Qid-2
- CLOSE ComQ QID=Qid-2

FIG. 15F — LINK QID=Qid-2 TID=Qid-1

FIG. 15G — LINK Qid-2 Qid-1

FIG. 15H — PLAY CONTROLLED DEVICE 104-7 MATERIAL-2@Qid-1

FIG. 15I — COMBINE CONTROLLED DEVICE 104-4 Port-3 Port-2@Qid-1

FIG. 15J
- CONTACT INPUT-1
- Gpi-3  Gpi-3
- PLAY MATERIAL-1  COMBINE Port-1 Port-2

FIG. 15K
- (CD-TIMER)
- Qid-1  Qid-1
- COMBINE Port-3 Port-2  PLAY MATERIAL-2

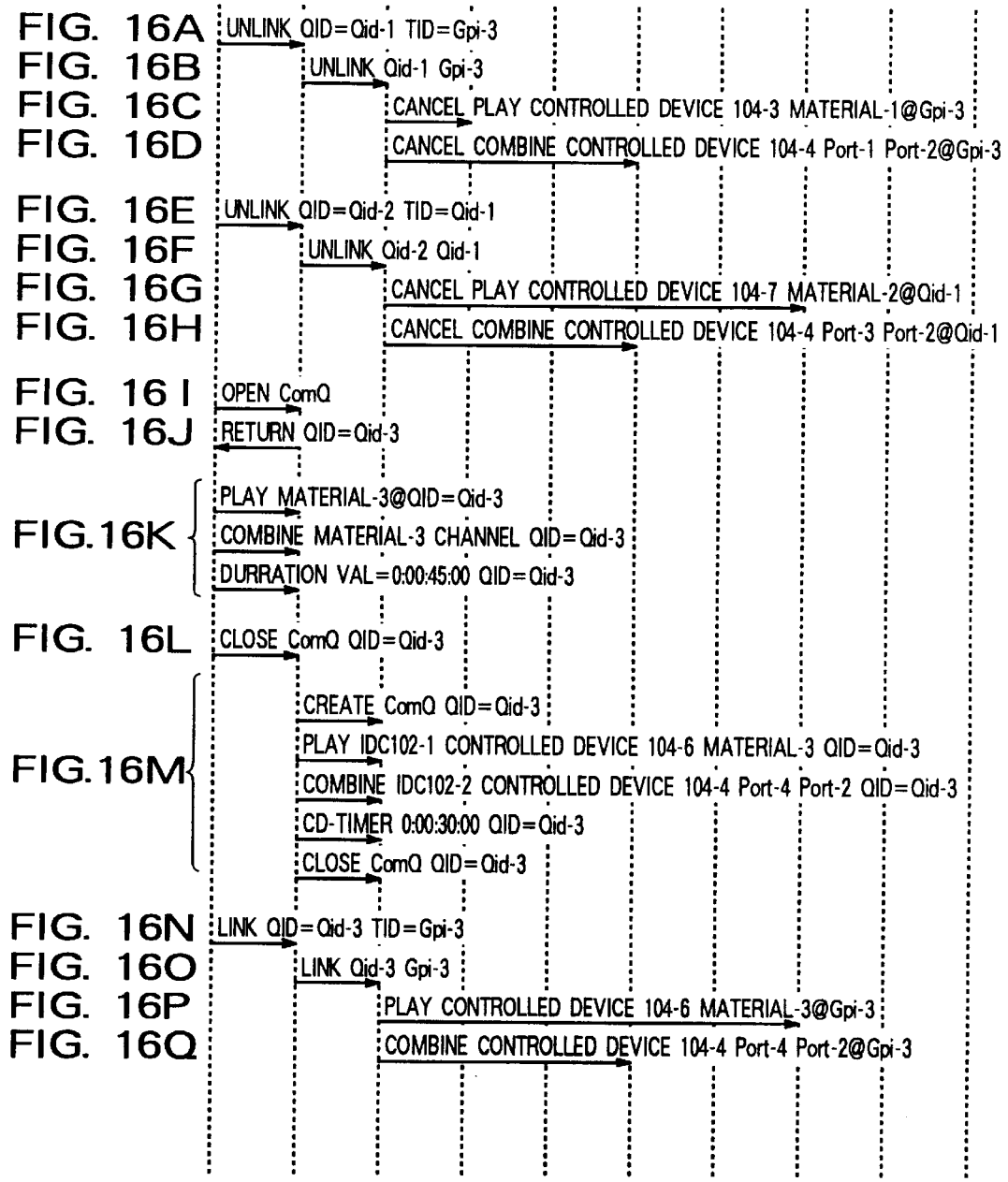

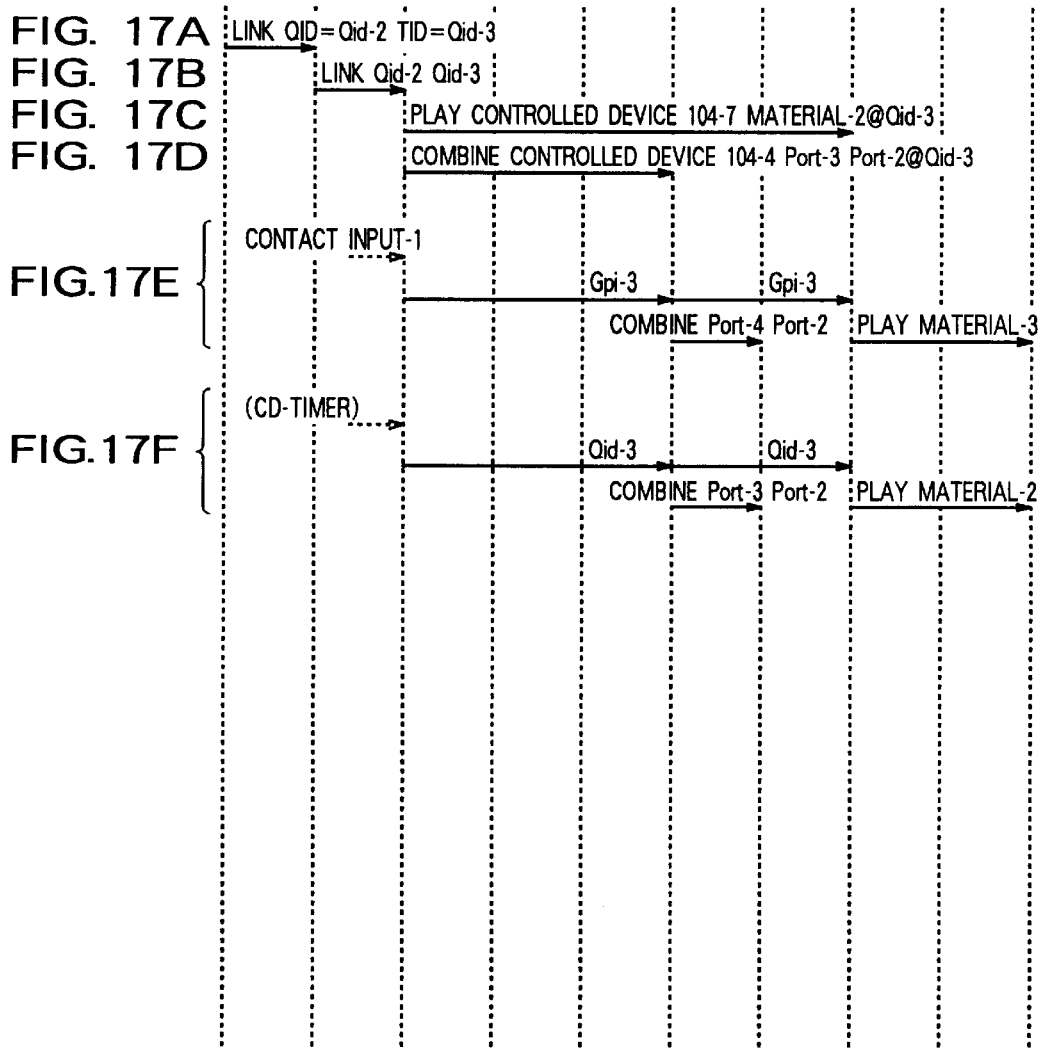

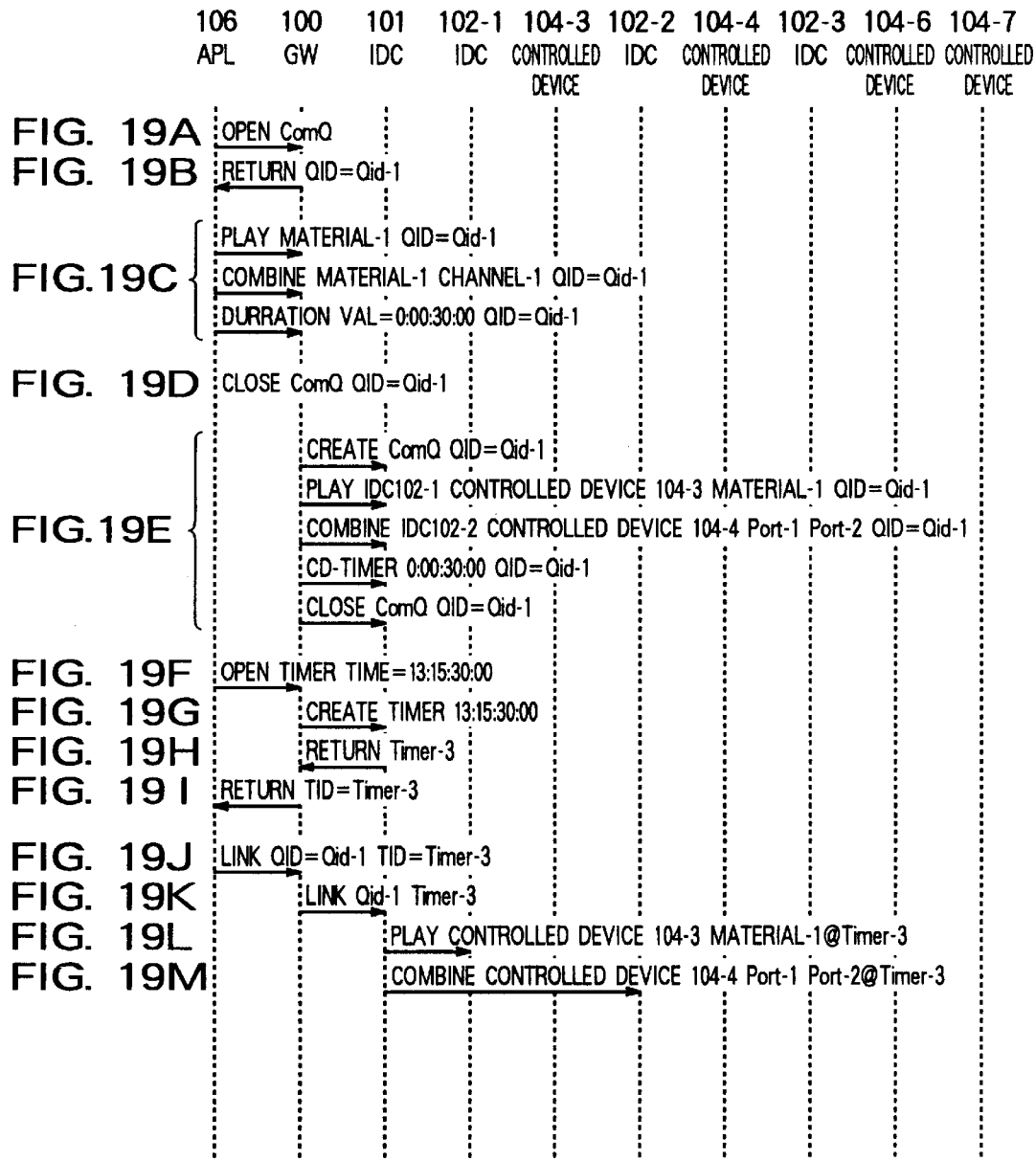

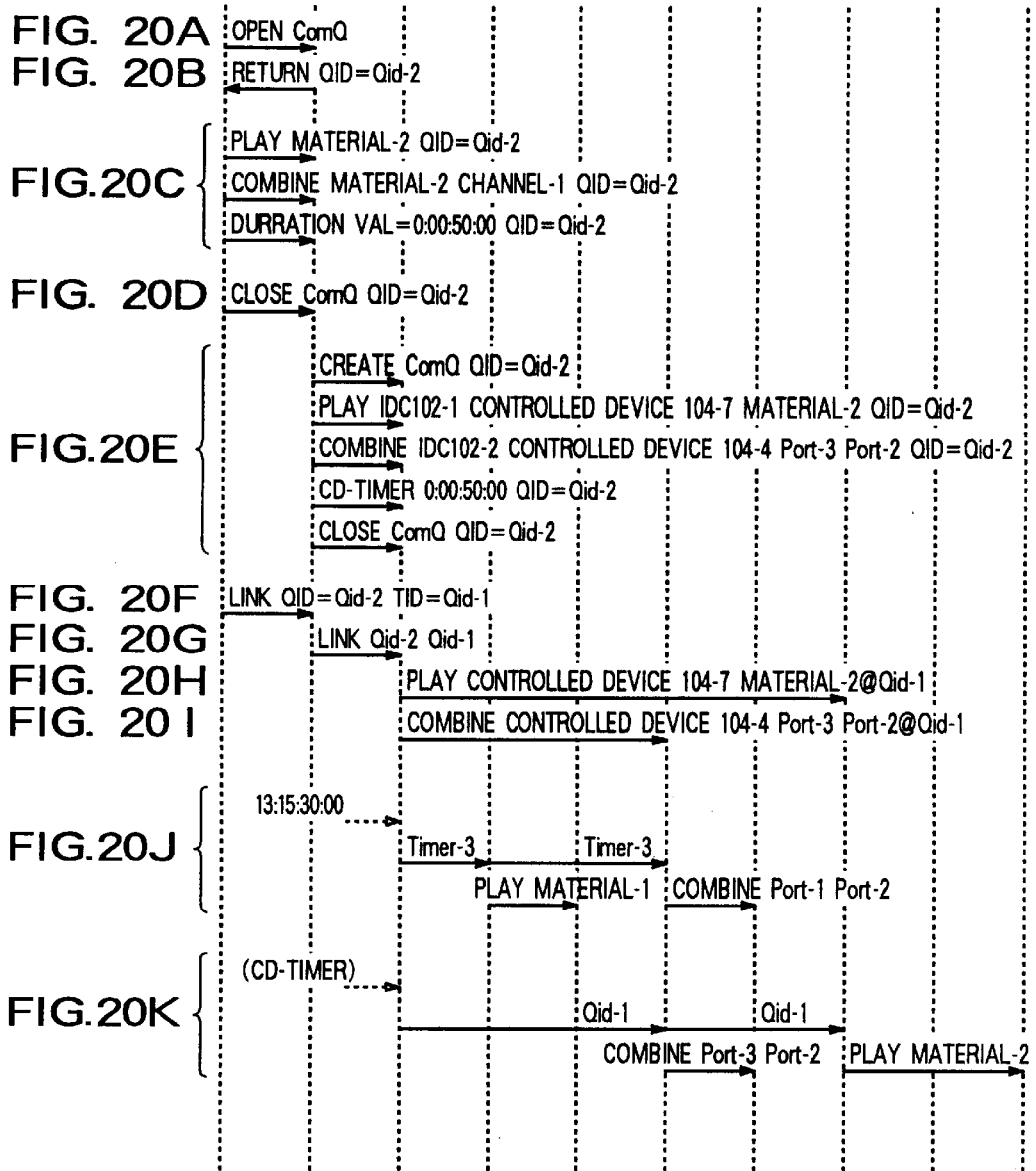

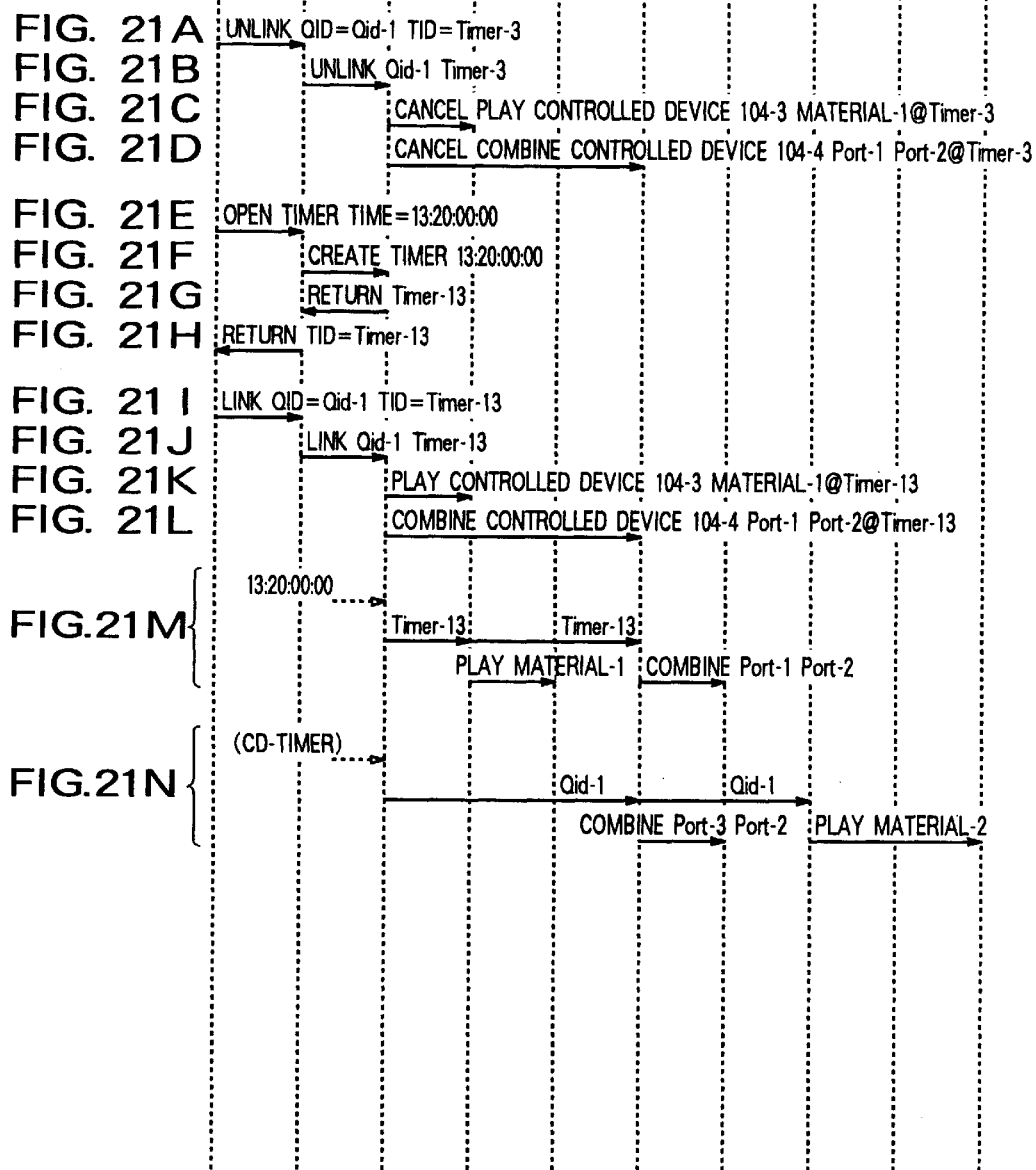

DATA PROCESSING CONTROL DEVICE AND METHOD OF SAME

BACKGROUND OF THE INVENTION

1. Field of the Invention

The present invention relates to a data processing control device for controlling a plurality of data processing apparatuses, for example, VTR apparatuses and Disk apparatuses, etc. to process AV (video and/or audio) data and a method of the same.

2. Description of the Related Art

In a television broadcasting station, for example, the picture and sound to be telecast is usually produced by recording the materials of the picture and sound to be telecast on video tapes for individual management, reproducing one or more video tapes of the AV data by using one or more VTR apparatuses, combining and editing the reproduced AV data, and recording the AV data to be actually broadcast on another tape.

In such editing, the recording and reproduction control and line control for a plurality of VTR apparatuses are simultaneously carried out.

In such control, one instructs the start of the reproduction processing of a VTR apparatus by depressing a switch on for example a panel or generating a trigger at a set time based on the count of a timer, but this switch operation or the trigger instructs not only the start of reproduction processing of the VTR apparatus, but also the timing for performing the line control.

In an AV data processing control device, when for example both of the reproduction by the VTR apparatus and the line switching control are simultaneously executed based on a trigger generated by a predetermined contact input caused by depression of a switch or the like or the trigger generated by a timer, it is considered that the reproduction command containing the trigger and the line switching command are separately set and processed without linking them with each other.

In the AV data processing control device explained above, however, when it is desired to change for example the VTR apparatus performing the reproduction, it is necessary to individually change all commands related to the settings for the reproduction by the VTR apparatus.

For this reason, there is a problem that there is a high possibility of omission of a command which should be changed and an erroneous change of a command.

Further, there is a problem that the operating time accompanying such a change of settings is long, and thus there is a high possibility that a contact input will be generated during a period when the settings are being changed or the trigger will be generated by a timer at the set time, and only the commands for which the settings had not been changed at that point of time will be executed.

Such a problem particularly occurs where a large number of related commands exist.

Further, when continuously reproducing a material-2 after a material-1, it is considered that in the past the settings for the reproduction for the material-1 were set, the reproduction of the material-1 was started by a contact input etc., then the time for starting the reproduction of the material-2 was found based on this start time and the reproduction time of the material-1 and the settings for reproduction of the material-2 were set using this time.

In this case, when changing the settings so as to reproduce the material-2 in place of the material-1 for example, it is necessary to invalidate the settings of the material-1 and newly set the settings of the material-3 and further begin to set the settings of the material-2 over again due to the change of the time for start of reproduction of the material-2. For this reason, when there are many steps in the setting of reproduction of the material-2, the load on the user accompanying the change of the settings is large and, at the same time, a long time is consumed for making the changes.

SUMMARY OF THE INVENTION

An object of the present invention is to provide a AV data processing control device which can correctly perform the change of a command and in addition can reduce the load on a user accompanying a change when a plurality of data processing-apparatuses are controlled by using a plurality of related commands.

In order to solve the above problems of the prior art and achieve the above object, the data processing control device and method of the present invention provide a data processing control device for controlling a plurality of processing apparatuses and a method thereof which process at least one of video and audio data so as to continuously reproduce second material subsequent to first material, having an input means for inputting a plurality of control commands containing a plurality of control commands concerning the first material which indicate the control contents of the processing apparatuses and to which a first identifier is attached, a plurality of control commands concerning the second material to which a second identifier is attached, and a link command for linking the identifier of a first trigger and the first identifier of the control commands and linking the identifier of a second trigger and the second identifier of the control commands; a trigger generating means for generating the second trigger at a time determined based on a time of generation of the first trigger and a reproduction time of the first material; and a command executing means for executing the control commands containing the identifier linked to the identifier of the first trigger when the first trigger is generated and executing the control commands linked to the identifier of the second trigger when the second trigger is generated.

In the data processing control device of the present invention and the method of the same, in accordance with for example the operation by a user, a plurality of control commands including a plurality of control commands concerning the first material which indicate the control contents of the processing apparatuses and to which a first identifier is attached and a plurality of control commands concerning the second material to which a second identifier is attached and a link command for linking the identifier of a first trigger and first identifier of the control commands and linking the identifier of a second trigger and second identifier of the control commands are input to the input means.

Further, by the trigger generating means, the second trigger is generated at the time determined based on the time of generation of the first trigger and the reproduction time of the first material.

The command executing means executes the control commands containing the identifier linked to the identifier of the first trigger when the first trigger is generated and executes the control commands linked to the identifier of the second trigger when the second trigger is generated.

Namely, in the data processing control device of the present invention and the method of the same, by the trigger, executions of a plurality of control commands linked to the trigger are controlled together. For this reason, when desiring to invalidate the execution of these linked control commands all together, it is sufficient to invalidate the link of the trigger and the identifier of the control commands. For this reason, the execution of all linked control commands can be invalidated correctly in a short time.

Further in order to solve the above problems of the prior art and achieve the above object, the data processing control device of the present invention and a method of the same are a data processing control device for controlling a plurality of processing apparatuses processing at least one of video and audio data and a method of the same, wherein a plurality of control commands in which a common identifier is attached to related commands and which instruct the control contents of the processing apparatuses and a link command for linking the identifier of a trigger generated with the count of a timer as a reference and the identifier of the control commands are input; and when the trigger is generated, a plurality of control commands containing the identifier related based on the link command are executed with respect to the trigger.

In the data processing control device of the present invention and the method of the same, a plurality of related commands, for example, a line connection command for reproduction of material and outputting the result of reproduction are input while attaching the same identifier to them. Further, the link command for linking the identifier of the trigger generated with the count of the timer as a reference and the identifier of the control commands is input. Then, for example, when the predetermined time comes and the trigger is generated from the timer, a plurality of linked control commands containing the identifier are executed together based on the link command with respect to the trigger. Further, when the link of the identifier of the trigger and the identifier of the control commands is invalidated, even if the trigger is generated, none of the control commands containing the identifier are executed. For this reason, the execution of all related commands can be easily changed together.

Further, in the data processing control device of the present invention and the method of the same, preferably the link releasing command containing the identifier of the control commands and the identifier of the trigger is input and the already determined link of the identifier of the control commands and the identifier of the trigger is invalidated based on the input link releasing command.

Further in order to solve the above problems of the prior art and achieve the above object, an data processing control device of the present invention and a method of the same are an data processing control device for controlling a plurality of processing apparatuses processing at least one of video and audio data and a method of the same, wherein: a plurality of control commands in which a common identifier is attached to related commands and which instruct the control contents of the processing apparatus and a link command for linking the identifier of a trigger generated by a contact input in accordance with the operation of an operating means and the identifier of the control command are input; and when the trigger is generated, a plurality of control commands containing the identifier related based on the link command are executed with respect to the trigger.

In the data processing control device of the present invention and the method of the same, a plurality of related commands, for example, the line connection command for reproduction of the material and outputting the results of the reproduction are input while attaching the same identifier to them. Further, the link command for linking the identifier of the trigger generated by the contact input in accordance with the operation of the operating means and the identifier of the control command is input. Then, for example, when a contact input is generated and the trigger is generated, a plurality of linked control commands containing the identifier are executed together based on the link command with respect to the trigger. Further, when the link of the identifier of the trigger and the identifier of the control commands is invalidated, even if the trigger is generated, none of the control commands containing the identifier are executed. For this reason, the execution of all related commands can be easily changed together.

BRIEF DESCRIPTION OF THE DRAWINGS

The above and other objects and features of the present invention will be described more in detail with reference to the accompanying drawings, in which:

FIGS. 12A to 12Q are a signal flow diagram for explaining the processing for setting up continuous reproduction of the material-2 subsequent to the reproduction of the material-1 in the AV data processing control device according to a fifth embodiment of the present invention;

FIGS. 13A to 13W are a signal flow diagram for explaining the processing for changing the setting performed in FIG. 12 to the setting for continuous reproduction of the material-2 subsequent to the reproduction of the material-3;

FIGS. 14A to 14M are a signal flow diagram for explaining the processing for linking the reproduction of the material-1 and the contact input-1 in the AV data processing control device according to a sixth embodiment of the present invention;

FIGS. 15A to 15K are a signal flow diagram for explaining the processing for reproducing the material-2 continuously after the reproduction of the material-1 set in FIG. 14;

FIGS. 16A to 16Q are a signal flow diagram for explaining the processing for changing the setting performed in FIG. 14 and FIG. 15 to the processing for reproducing the material-2 continuously after the reproduction of the material-3;

FIGS. 17A to 17F are a signal flow diagram for explaining the processing for changing the setting performed in FIG. 14 and FIG. 15 to the processing for reproducing the material-2 continuously after the reproduction of the material-3;

FIGS. 19A to 19M are a signal flow diagram for explaining the processing for linking the reproduction of the material-1 and the time of the timer in the AV data processing control device according to a seventh embodiment of the present invention;

FIGS. 20A to 20K are a signal flow diagram for explaining the processing for reproducing the material-2 continuously after the reproduction of the material-1 set in FIGS. 19A to 19M;

FIGS. 21A to 21N are a signal flow diagram for explaining the processing for changing the time for start of the reproduction of the material-1 after performing the setting performed in FIGS. 19A to 19M and FIGS. 20A to 20K.

DESCRIPTION OF THE PREFERRED EMBODIMENTS

Below, an explanation will be made of an AV data processing control device according to an embodiment of the present invention.

First, an explanation will be made of the configuration of an audio and video data recording and reproducing apparatus according to the present embodiment.

Figure 1:
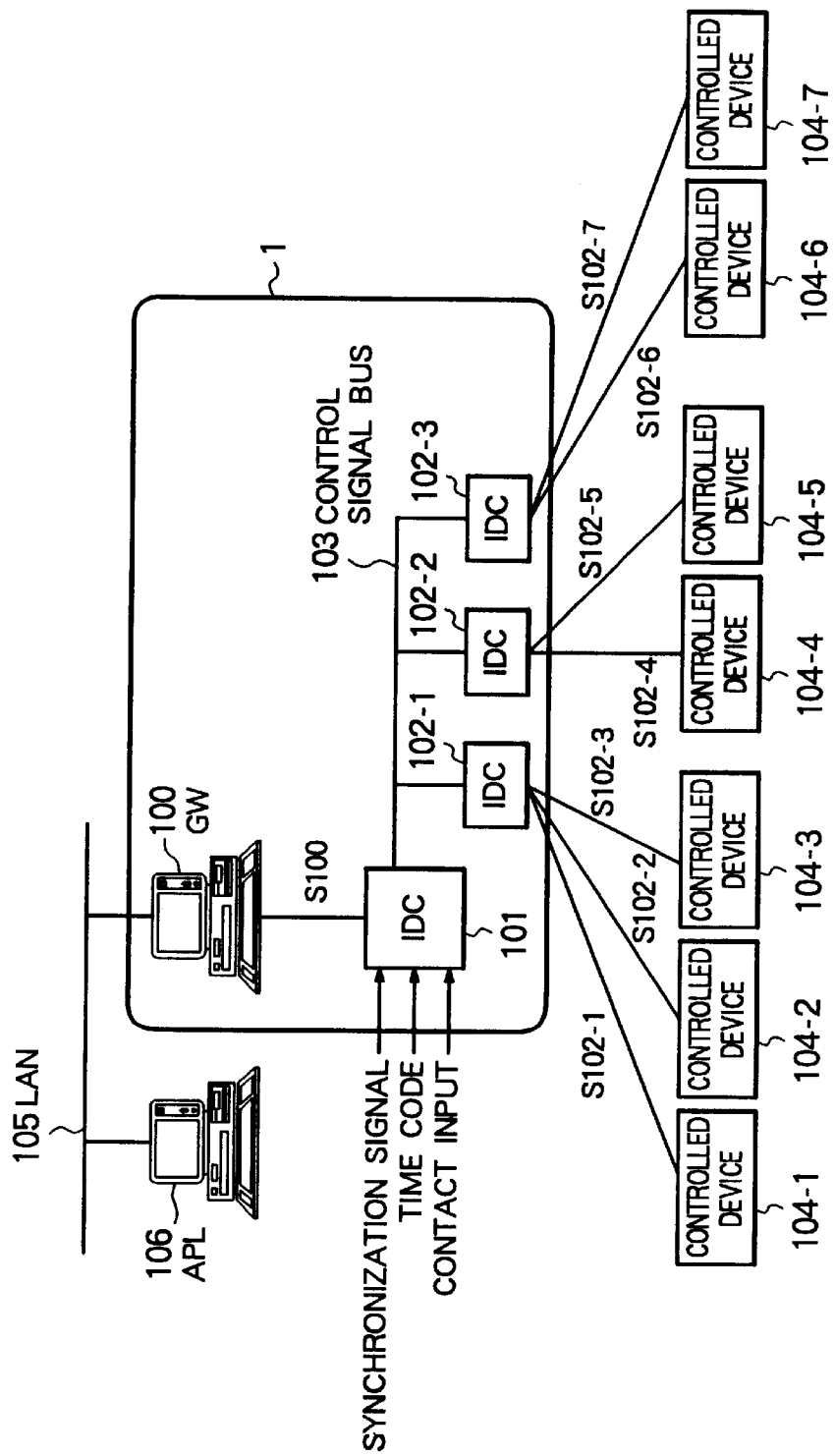
FIG. 1 is a view of the configuration of an AV data processing control device according to an embodiment of the present invention.

FIG. 1 is a view of the configuration of an AV data processing control device of the present embodiment.

The AV data processing control device shown in FIG. 1 has a gateway (GW) 100, an IDC (intelligent device controller) 101, an IDC 102-1, 102-2, 102-3, and a control signal bus 103.

The gateway 100 is connected to a computer on which an application (APL) is mounted via a LAN 105. To the gateway 100 is connected the IDC 101.

To the IDC 101, IDC 102-1, 102-2 and 102-3 are further connected via the control signal bus 103.

The IDC102-1 has connected to it controlled devices 104-1, 104-2, and 104-3. The IDC 102-2 has connected to it controlled devices 104-4 and 104-5. The IDC 102-3 has connected to it controlled devices 104-6 and 104-7.

In the present embodiment, the controlled device 104-3 is a hard-disk device which performs the reproduction of the material-1 and is provided with a port having a port number Port-1. Also, the controlled device 104-6 is a hard-disk device which performs the reproduction of the material-3 and is provided with a port having a port number Port-4. Further, the controlled device 104-7 is a hard-disk device which performs the reproduction of the material-2 and is provided with a port having a port number Port-3. Further, the controlled device 104-4 has a channel-1 having a port with a port number Port-2 and performs the line control. The channel-1 is connected to for example a not illustrated recording device. Here, the material-1, the material-2, and the material-3 are AV data.

The gateway 100 determines to which controlled device should the command be sent based on the command sent from the application 106 via the LAN 105. That determined command is output as a control signal S100 to the IDC 101.

The IDC 101 inputs a synchronization signal, a time code, and a contact input signal from the outside. The IDC 101 outputs the command input from the gate way 100, the synchronization signal input from the outside, and the command and execution timing generated based on the time code and the contact input signal via the control signal bus 103 to the IDC 102-$n$ ($n=1, 2, 3$). Here, the "contact input" means the input generated when a switch on the panel is depressed by a user. Further, the IDC 101 is provided with a countdown timer function.

In the IDC 102-$n$, based on the input command and execution timing, the control signal S102-$m$ ($m=1$ to 7) is output to the controlled device 104-$m$ to control the controlled device 104-$m$ in real time.

Note that the number of the IDC 102 connected to the IDC 101 shown in FIG. 1 and the number of the controlled device 104 connected to the IDC 102 are arbitrary.

The following embodiments relate to an AV data processing control device having the configuration shown in FIG. 1.

First Embodiment

The AV data processing control device of the present embodiment performs the reproduction of the material-1 by using the contact input as a trigger. For example, in a live broadcast program, when a certain condition is exhibited, switches the picture and displays the reproduced image of the material-1.

Figure 2:
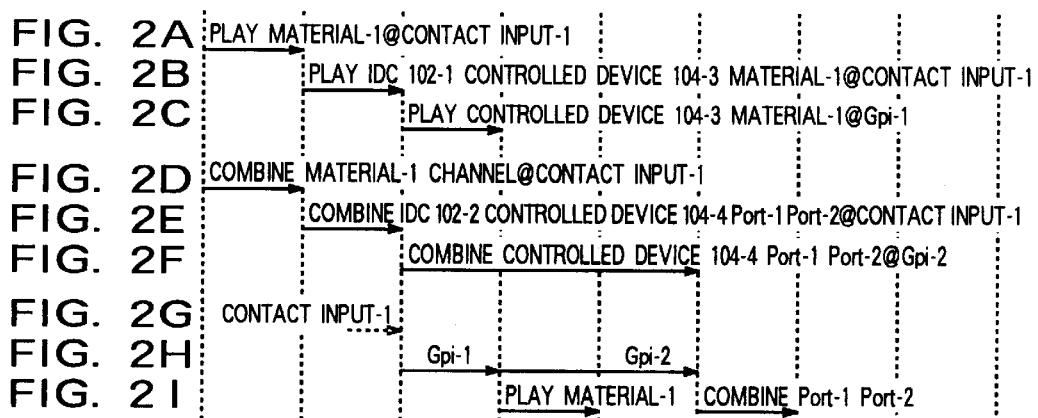
FIGS. 2A to 2I are a signal flow diagram for explaining processing for setting up the reproduction of a material-1 in the AV data processing control device according to a first embodiment of the present invention.

For example, as shown in FIG. 2A, the command shown in the following (1) is output from the application 106 shown in FIG. 1 to the gateway 100.

PLAY MATERIAL-1 @ CONTACT INPUT-1     (1)

At this time, the gateway 100 searches through its own database and specifies in which controlled device 104-$m$ does the material-1 exist. For example, if it exists in the controlled device 104-3, it is seen that the controlled device 104-3 is controlled by the IDC 102-1.

The gateway 100 outputs the command shown in the following (2) to the IDC 101 as shown in FIG. 2B.

PLAY IDC 102-1 CONTROLLED DEVICE 104-3 MATERIAL-1
@ CONTACT INPUT-1     (2)

In the IDC 101 receiving the command shown in above (1), a monitoring operation for the contact input-1 is set and is registered as the trigger. When this registered trigger is defined as Gpi-1, as shown in FIG. 2(C), the gateway 100 outputs the command shown in the following (3) to the IDC 102-1.

PLAY CONTROLLED DEVICE 104-3 MATERIAL-1 @ GPI-1(3)

In the IDC 102-1, preparations for executing the PLAY command are made and the input of the trigger Gpi-1 from the IDC 101 is awaited. The IDC 101 outputs the trigger Gpi-1 to the IDC 102-1 as shown in FIG. 2H when there is an input of the contact input-1 as shown in FIG. 2G. The IDC 102-1 executes the previously prepared PLAY command as shown in FIG. 2I when the trigger Gpi-1 is input and reproduces the material-1 from the controlled device 104-3.

Here, so as to output the reproduced video and audio data to a required channel, it is necessary to switch the line simultaneously with the reproduction. For this reason, it is necessary to send the line switching command to the gateway 100 together with the reproduction command from the application 106.

The application 106 outputs the command shown in the following (4) to the gateway 100 as shown in FIG. 2D.

COMBINE MATERIAL-1 CHANNEL-1 @ CONTACT
INPUT-1 (4)

The gateway 100 first performs the search of the database when the command shown in above (4) is input and specifies the line control device, the port numbers of the device in which the material-1 exists, the line control device to which this device is connected and the port number of the line control device corresponding to the channel-1.

Here, this line control device is the controlled device 104-4, and the port number of this channel-1 is Port-2. Also, the port number of the controlled device 104-3 performing the reproduction of the material-1 is Port-1.

Here, the line control device is controlled by the IDC 102-2, therefore the gateway 100 outputs the command shown in the following (5) to the IDC 101 as shown in FIG. 2E.

COMBINE IDC 102-2 CONTROLLED DEVICE 104-4 PORT-1
PORT-2 @ CONTACT INPUT-1 (5)

The IDC 101 which inputs the command shown in above (5) sets the monitoring operation for the contact input-1 and registers the trigger. The trigger registered at this time is defined as Gpi-2. Here, the reason why another trigger is registered even though the contact input is the same as that at the previous PLAY command is that the IDC 101 cannot judge the connection of these PLAY command and COMBINE command and therefore must treat them independently.

The gateway 100 outputs the command shown in the following (6) to the IDC 101 as shown in FIG. 2F.

COMBINE IDC 102-2 CONTROLLED DEVICE 104-4 PORT-1
PORT-2 @ GPI-2 (6)

The IDC 102-2 makes preparations for executing the COMBINE command and awaits the input of the trigger Gpi-2 from the IDC 101. The IDC 101 monitors the contact input-1 and, as shown in FIG. 2G, when there is the contact input-1, as shown in FIG. 2H, outputs the trigger Gpi-2 to the IDC 102-2. The IDC 102-2, when inputting the trigger Gpi-2, as shown in FIG. 2I, executes the previously prepared COMBINE command and has the controlled device 104-4 perform the line connection of the Port-1 and the Port-2.

Next, an explanation will be made of a case where the settings for the reproduction of the material-2 are made before performing the reproduction of the material-1 after setting the reproduction of the material-1 by the processing shown in FIGS. 2A to 2F mentioned above. Namely, an explanation will be made of the processing where the settings for reproduction of material are changed from the material-1 to the material-2.

Figure 3:
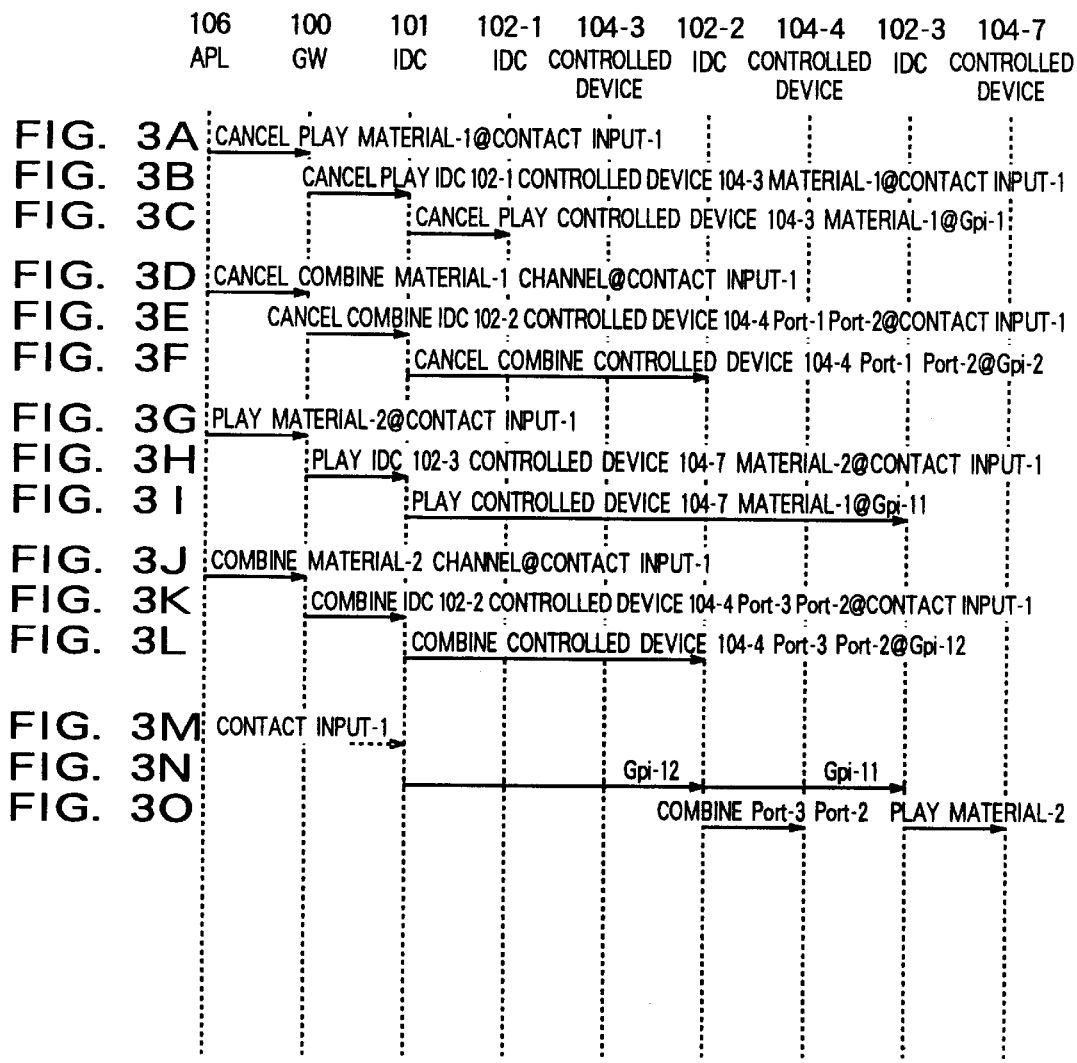
FIGS. 3A to 3O are a signal flow diagram for explaining the processing for setting up the reproduction of the material-2 by changing the setting for reproduction of the material-1 set in FIGS. 2A to 2I.

First, the reproduction (PLAY command shown in above (1), (2), and (3) performed in FIGS. 2A, 2B, and 2C are invalidated by the "CANCEL PLAY" command as shown in FIGS. 3A, 3B, and 3C. Further, the line control command (COMBINE) shown in above (4), (5), and (6) performed in FIGS. 2D, 2E, and 2F are invalidated by the "CANCEL COMBINE" command as shown in FIGS. 3D, 3E, and 3F.

Then, as shown in FIGS. 3G to 3L, for the new material-2, the reproduction command and the link control command are output from the application 106. Here, the processing shown in FIGS. 3G to 3L is similar to the processing shown in FIGS. 2A to 2F mentioned before. Here, the material-2 is reproduced by the controlled device 104-7 shown in FIG. 1, and the line control device is the controlled device 104-4.

In the reproduction of the material-2, when the contact input-1 is input as shown in FIG. 3M, the IDC 101 outputs the triggers Gpi-11 and Gpi-12 to the IDC 102-3 and 102-2 as shown in FIG. 3N, respectively.

The controlled device 104-7 performs the reproduction of the material-2 when the IDC 102-3 inputs the trigger Gpi-11 as shown in FIG. 3O. The controlled device 104-4 connects the port-2 of the channel-1 and the port-3 of the controlled device 104-7 and performs the switching processing of the line when the IDC 102-2 inputs the trigger Gpi-12 as shown in FIG. 3O.

In the AV data processing control device of the present embodiment, where the reproduction material is changed from the material-1 to the material-2, the application 106 separately outputs the "CANCEL PLAY" command and "CANCEL COMBINE" command to the gateway 100 as shown in FIGS. 3A and 3B and invalidates the "PLAY" command and "COMBINE" command for the material-1 which has been already output. However, if the application 106 must output two CANCEL commands in this way, there is a possibility that an omission may occur in the operation for invalidating the command and an erroneous command may be invalidated. Particularly, where there are many related commands, the generation of an invalidation command is troublesome and a mistake is apt to occur.

Further, in the AV data processing control device of the present embodiment, as shown in FIGS. 3A to 3F, relatively many steps are required until all invalidation processings are ended for the reproduction processing of the material-1 and a long time is taken for the invalidating processing. For this reason, there is a high possibility of generation of a contact input-1 during a period where the reproduction of the material-1 is invalidated. For example, if the contact input-1 is generated at the point of time when the invalidation processing shown in FIG. 3C is ended, the "PLAY" command shown in FIGS. 2A to 2C becomes invalid, but the "COMBINE" command shown in FIGS. 2D to 2F is executed. As a result, unrequited AV data is sometimes output. In this way, in the AV data processing control device of the first embodiment, a possibility of occurrence of the inconvenience where only one part of the command is executed among the related commands is high.

Second Embodiment

In the AV data processing control device of the present embodiment, the problems in the AV data processing control device of the first embodiment were solved by grouping together the commands to be simultaneously executed and attaching an identifier ID to this set. Here, the set of the commands which should be simultaneously executed is referred to as a command group ComQ, and the ID of this ComQ is referred to as QID.

This AV data processing control device performs the reproduction of the material-1 by using the contact input as a trigger similar to the first embodiment and switches the picture when a certain condition is exhibited in for example a live broadcast program to display the reproduced image of the material-1.

Below, an explanation will be made of the case where the reproduction setting processing of the material-1 is performed by using the command group ComQ.

Figure 4:
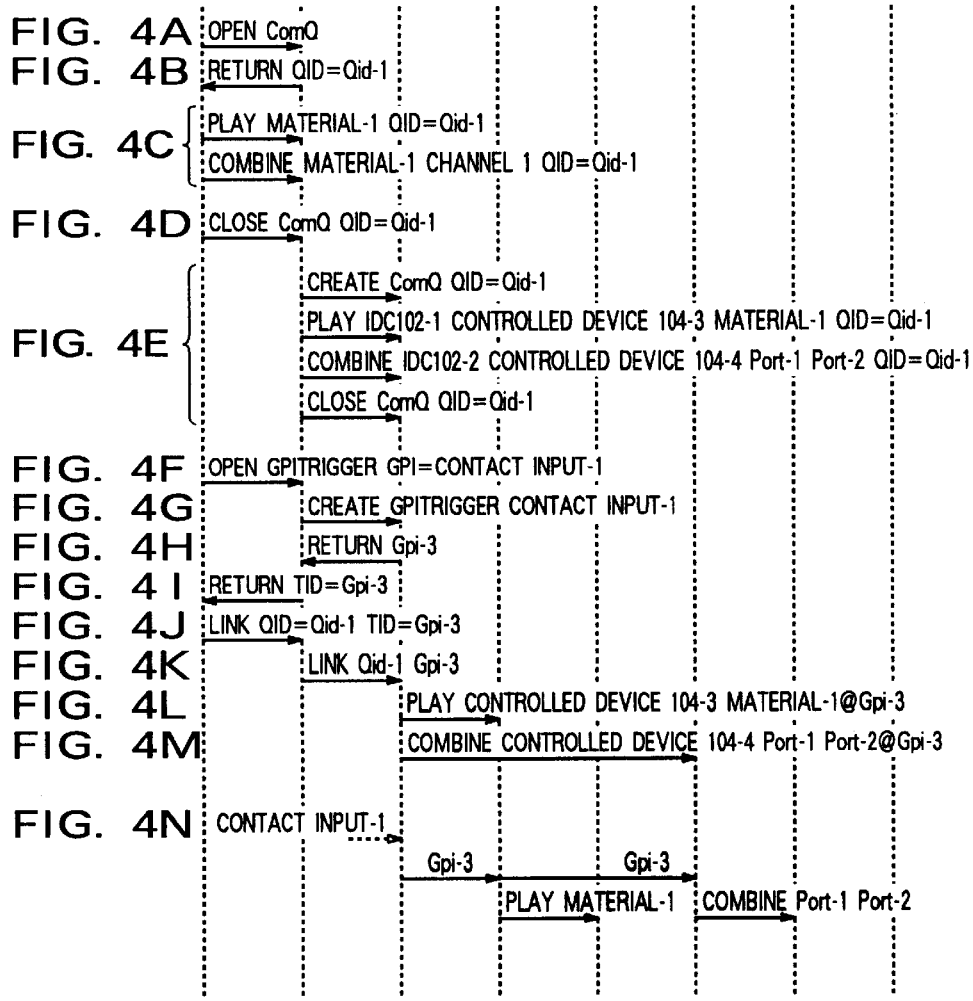
FIGS. 4A to 4N are a signal flow diagram for explaining the processing for setting up the reproduction of the material-1 in the AV data processing control device according to a second embodiment of the present invention.

First, the application 106 outputs the command shown in the following (7) to the gateway 100 as shown in FIG. 4A to instruct the preparation of the ComQ and obtains the QID.

OPEN COMQ (7)

The gateway 100 receiving the command shown in the above (7) secures the region of the ComQ in the internal portion and returns the identifier QID thereof to the application 106. At this time, when the QID is Qid-1, the gateway 100 returns the Qid to the application 106 by using the command shown in the following expression (8) as shown in FIG. 4B:

RETURN QID=QID-1 (8)

Thereafter, the application 106 clearly indicates which commands are to be grouped together by adding the Qid-1 received from the gateway 100 to the commands.

As in the present embodiment, when reproducing the material-1 and outputting it to the channel-1, as shown in FIG. 4C, it is sufficient so far as the application 106 outputs the commands shown in the following (9) and (10) to the gateway 100:

PLAY MATERIAL-1 QID=QID-1 (9)

COMBINE MATERIAL-1 CHANNEL-1 QID=QID-1 (10)

When inputting the commands shown in the above (9) and (10), the gateway 100 registers these two commands in the region of ComQ corresponding to Qid-1.

When the setting of the required commands is ended, the application 106 outputs the data indicating this, for example, the command shown in the following (11), to the gateway 100 as shown in FIG. 4D:

CLOSE ComQ QID=QID-1 (11)

The gateway 100 recognizes that the setting with respect to the ComQ is ended when the command shown in the above (11) is input.

The gateway 100 can output the contents of the ComQ to the IDC 101 at this point of time or can output the same at the point of time when the time for start of execution of ComQ is designated. Further, it is also possible for the gateway 100 to output the contents of ComQ to the IDC 101 whenever the command is input from the application 106.

The gateway 100 searches through the database prepared in advance and prepares the commands to be output to the IDC 101 based on the results of the search.

From the gateway 100 to IDC 101, as shown in for example FIG. 4E, the commands shown in the following (12) to (15) are output in the following order:

CREATE COMQ QID=QID-1 (12)

PLAY IDC 102-1 CONTROLLED DEVICE 104-3 MATERIAL-1 QID=QID-1 (13)

COMBINE IDC 102-2 CONTROLLED DEVICE 104-4 PORT-1 PORT-2 QID=QID-1 (14)

CLOSE COMQ QID=QID-1 (15)

When inputting the commands shown in the above (12) to (15), the IDC 101 stores these commands in the memory and awaits the designation of the trigger for executing this ComQ.

Next, the application 106 must designate the contact input for executing the ComQ. The designation of this contact input is carried out by outputting the command shown in the following (16) from the application 106 to the gateway 100 as shown in for example FIG. 4F. This command is for setting the monitoring operation so that the trigger is generated when there is a contact input-1.

OPEN GPITRIGGER GPI=CONTACT INPUT-1 (16)

When the command shown in the above (16) is input, the gateway 100 outputs the monitoring operation command of the contact input-1 shown in the following (17) to the IDC 101 as shown in FIG. 4G.

CREATE GPITRIGGER CONTACT INPUT-1 (17)

When receiving the command shown in the above (17), the IDC 101 sets the monitoring operation of the contact input-1 and registers the same as the trigger. When the trigger at this time is defined as Gpi-3, the IDC 101 outputs the command shown in the following (18) to the gateway 100 as shown in FIG. 4H and transfers the trigger ID to the gateway 100.

RETURN GPI-3 (18)

Further, the gateway 100 further outputs the command shown in the following expression (19) to the application 106 as shown in FIG. 4I and transfers the trigger ID.

RETURN TID=GPI-3 (19)

By this, the application 106 sets the monitoring operation of the contact input-1 and obtains the trigger ID thereof.

The application 106 designates the execution timing of the ComQ by linking the input trigger ID and the ComQ which was previously prepared. The application 106 outputs the command shown in the following (20) to the gateway 100 as shown in for example FIG. 4J:

LINK QID=QID-1 TID=GPI-3 (20)

The gateway 100 receiving the command shown in the above (20) performs the linking of the ComQ and TID also with respect to the IDC 101. For example, the gateway 100 outputs the command shown in the following expression (21) to the IDC 101 as shown in FIG. 4K:

LINK QID-1 GPI-3 (21)

The IDC 101 which inputs the command shown in the above (21) outputs the command to the IDC 102-1 and IDC 102-2 since the previously prepared ComQ and the trigger for execution this are linked. The IDC 101 outputs the command shown in the following expression (22) to the IDC 102-1 as shown in FIG. 4L.

PLAY CONTROLLED DEVICE 104-3 MATERIAL-1 @ GPI-22)

The IDC 102-1 makes the preparations for executing the PLAY command and awaits the input of the trigger Gpi-3 from the IDC 101. The IDC 101 subsequently outputs the command shown in the following (23) to the IDC 102-2 as shown in FIG. 4M.

COMBINE CONTROLLED DEVICE 104-4 PORT-1 PORT-2 @ GPI-3 (23)

The IDC 102-2 makes the preparations for executing the COMBINE command and awaits the input of the trigger Gpi-3 from the IDC 101.

The IDC 101 monitors the contact input-1 and, when there is an input of the contact input-1, as shown in FIG. 4N, outputs the trigger Gpi-3 to the IDC 102-1 and IDC 102-2.

The IDC 102-1, when inputting the trigger Gpi-3, executes the previously prepared PLAY command and outputs the instruction for performing the reproduction of the material-1 to the controlled device 104-3. Simultaneously with this, the IDC 102-2 executes the previously prepared COMBINE command when inputting the trigger Gpi-3 and has the controlled device 104-4 perform the line connection of the Port-1 and Port-2.

Figure 6:
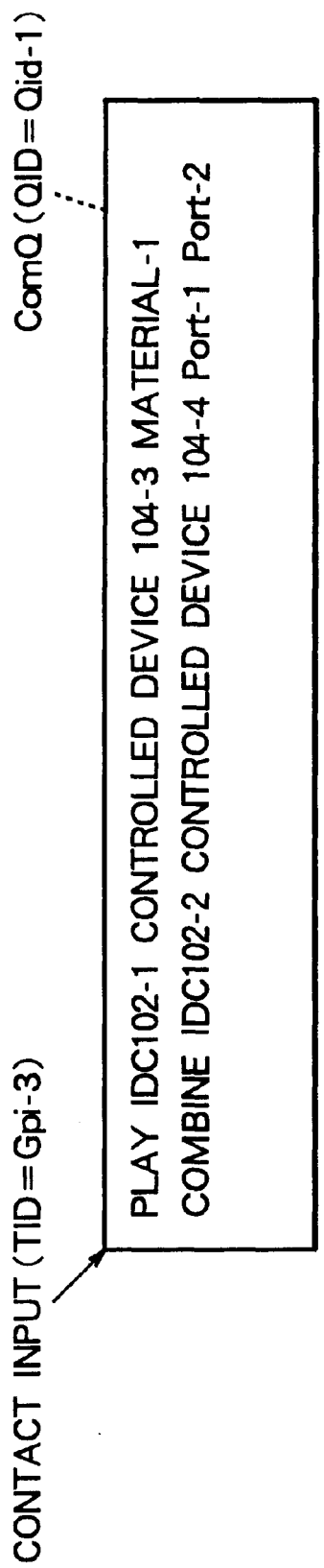
FIG. 6 is a view for explaining the concept of the command group in the AV data processing control device according to the second embodiment of the present invention.

Namely, the AV data processing control device of the present embodiment, as shown in FIG. 6, registers the PLAY command and the COMBINE command as the command group ComQ of the identifier Qid-1 and instructs the start of execution of this command group ComQ by the contact input of the trigger Gpi-3.

Next, an explanation will be made of the case of changing the settings so that the reproduction of the material-2 is carried out by the contact input-1 before the reproduction of the material-1 is carried out after the reproduction of the material-1 is set by the processing shown in FIGS. 4A to 4M. Namely, an explanation will be made of the processing for changing the settings for reproduction of the material from the material-1 to the material-2.

At this time, the application 106 invalidates the link of the ComQ of the material-1 and the contact input-1 and prepares a new ComQ for the material-2.

Figure 5:
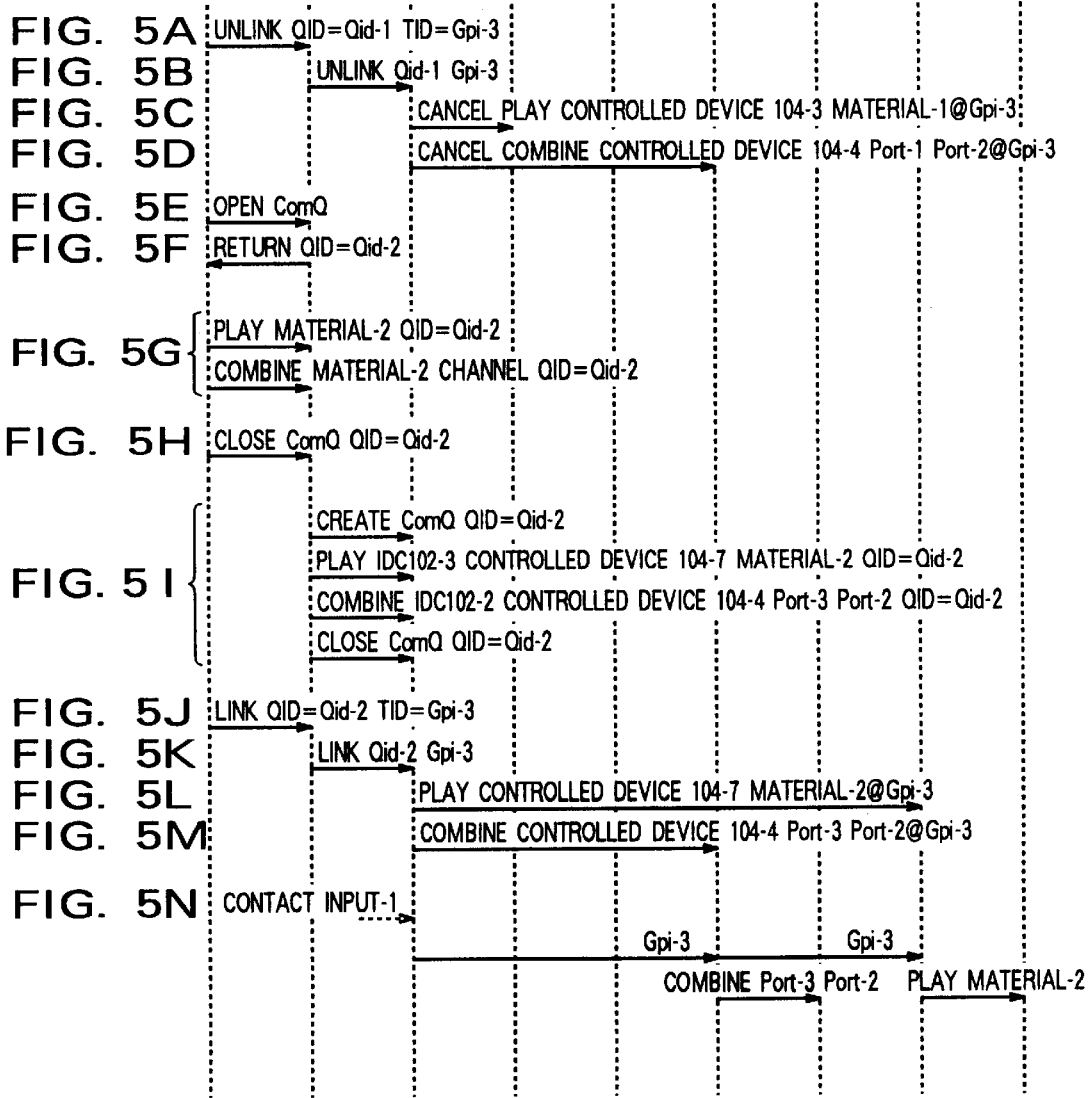
FIGS. 5A to 5N are a signal flow diagram for explaining the processing for setting up the reproduction of the material-2 by changing the setting for reproduction of the material-1 se in FIGS. 4A to 4N.

First, the application 106 outputs the command shown in the following (24) to the gateway 100 as shown in FIG. 5A so as to invalidate the link of the ComQ of the material-1 and the contact input-1 which was previously set up.

$$\text{UNLINK QID=QID-1 TID=GPI-3} \qquad (24)$$

When inputting the command shown in the above (24), the gateway 100 outputs the command shown in the following (25) for invalidating the link of the ComQ of the material-1 and the contact input-1 to the IDC 101 as shown in FIG. 5B:

$$\text{UNLINK QID-1 GPI-3} \qquad (25)$$

When inputting the command shown in the above (25), the IDC 101 invalidates the link of the ComQ and the contact input-1. Accordingly, even in a case where the contact input-1 is generated after this, the trigger Gpi-3 is not output from the IDC 101 to the IDC 102-1 and IDC 102-2. Namely, all commands contained in the ComQ of the material-1 are not executed. On the other hand, when this invalidating command was not in time, all commands contained in the ComQ of the material-1 will be executed. Accordingly, a series of complete contents linked by the ComQ of the material-1 will be executed. For this reason, an operation such as connection to a line which outputs nothing due to the execution of only part of the commands will not occur. By this, the demand that all related commands be executed if they are to be executed is satisfied.

Next, the IDC 101 outputs the "CANCEL PLAY" command to the IDC 102-1 as shown in FIG. 5C to invalidate the PLAY command which has been already output to the IDC 102-1. Further, the IDC 101 outputs the "CANCEL COMBINE" command to the IDC 102-2 as shown in FIG. 5D to invalidate the COMBINE command which has been already output to the IDC 102-2.

Here, it is also possible for the application 106 to invalidate the contents of the Qid-1 or link the Qid-1 to a contact input other than the contact input-1.

Next, the application 106 performs the processing shown in FIGS. 5E to 5I so as to newly link the reproduction of the material-2 to the contact input-1, prepares the command group ComQ related to the reproduction of the material-2, and outputs the reproduction command and line control command to the gateway 100. Here, the processings of FIGS. 5E to 5I are respectively the same as the processings of FIGS. 4A to 4E except that the QID becomes Qid-2. Further, the material-2 is reproduced by the controlled device 104-7, therefore the contents of the command are changed in accordance with this, but there is no substantial difference.

Next, the application 106 outputs the command shown in the following (26) to the gateway 100 as shown in FIG. 5J so as to link the identifier Qid-2 of the command group concerning the reproduction of the material-2 and the contact input-1:

$$\text{LINK QID=QID-2 TID=GPI-3} \qquad (26)$$

Here, the Gpi-3 has been already defined as the trigger of the contact input-1, therefore it is used as it is.

Next, when the contact input-1 is generated as shown in FIG. 5N by performing the processing of the gateway 100 shown in FIG. 5K and the processing of the IDC 101 shown in FIGS. 5L and 5M, the reproduction of the material-2 is executed. Here, the processings of FIGS. 5K to 5M are similar to the processings of FIGS. 4K to 4M.

In the reproduction of the material-2, the IDC 101 outputs the trigger Gpi-3 to the IDC 102-3 and 102-2 when the contact input-1 is input as shown in FIG. 5N.

The IDC 102-3 instructs the reproduction of the material-2 by the controlled device 104-7 when the trigger Gpi-3 is input as shown in FIG. 5N. Further, the IDC 102-2 instructs the switching processing of the line by the controlled device 104-7 when the trigger Gpi-3 is input as shown in FIG. 5N.

According to the AV data processing control device of the present embodiment explained above, at a relatively early timing, that is, at a timing where the UNLINK command of the above (25) shown in FIG. 5B is output to the IDC 101, it is determined whether or not the change of settings from the reproduction of the material-1 to the reproduction of the material-2 is in time, therefore the decision of whether or not that change is in time is easy when the user changes the settings.

Further, according to the AV data processing control device of the present embodiment, all related commands are invalidated if that change of settings is in time and when the change of settings is not in time, all related commands are executed. For this reason, a situation where only a part of the commands is executed can be avoided.

Further, according to the AV data processing control device of the present embodiment, when the command shown in the above (24) shown in FIG. 5A is output from the application 106, all commands related to the reproduction of the material-1 can be invalidated, therefore a possibility of omission of a command for invalidation or error becomes low. This is particularly effective where there are many related commands.

Third Embodiment

The AV data processing control device of the present embodiment is used where a commercial is telecast during a television broadcast etc. The material-1 is reproduced at the prescribed time and output to the channel-1 by using a timer.

First, an explanation will be made of the processing for setting up the reproduction of the material-1.

Figure 7:
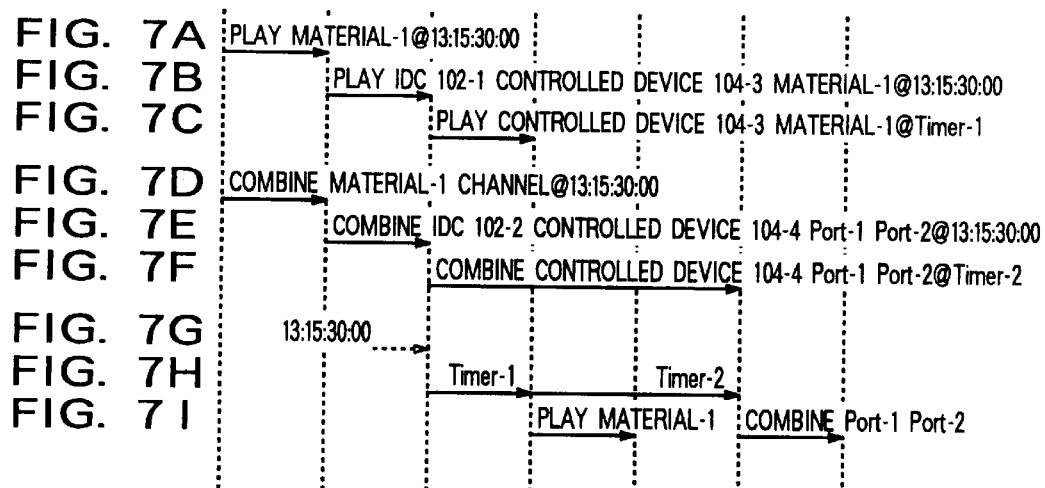
FIGS. 7A to 7I are a signal flow diagram for explaining the processing for setting up the reproduction of the material-1 in the AV data processing control device according to a third embodiment of the present invention.

For example, as shown in FIG. 7A, the command shown in the following (27) is output from the application 106 shown in FIG. 1 to the gateway 100. The command shown in the following (27) instructs that the reproduction of the material-1 be carried out at "115 hours, 30 minutes, and 00 second on the 13th".

PLAY MATERIAL-1 @ 13:15:30:00    (27)

The gateway 100 specifies in which controlled device 104-$m$ the material-1 exists by searching through its own database when the command shown in above (27) is input. For example, where the material-1 is reproduced by the controlled device 104-3, it is seen that this controlled device 104-4 is controlled by the IDC 102-1.

The gateway 100 outputs the command shown in the following (28) to the IDC 101 as shown in FIG. 7B.

PLAY IDC 102-1 CONTROLLED DEVICE 104-3 MATERIAL-1
    @ 13:15:30:00    (28)

The IDC 101 receiving the command shown in the above (28) sets the timer with respect to the time such as 13:15:30:00 and registers the trigger. At this time, when defining the registered trigger as Timer-1, as shown in FIG. 7C, the IDC101 outputs the command shown in the following (29) to the IDC 102-1:

PLAY CONTROLLED DEVICE 104-3 MATERIAL-1 @
    TIMER-1    (29)

The IDC 102-1 makes the preparation for executing the PLAY command and awaits the input of the trigger Timer-1 from the IDC 101. The IDC 101 compares the time code input from the output and the set time 13:15:30:00 of the timer and outputs the trigger Timer-1 to the IDC 102-1 as shown in FIGS. 7G and 7H when they coincide. The IDC 102-1 executes the previously prepared PLAY command as shown in FIG. 7I when the trigger Timer-1 is input and makes the controlled device 104-3 reproduce the material-1 therefrom.

Here, to output the reproduced video and audio data to the required channel, it is necessary to switch the line simultaneously with the reproduction. For this reason, it is necessary to send a line switching command to the gateway 100 together with the reproduction command from the application 106.

The application 106 outputs the command shown in the following (30) to the gateway 100 as shown in FIG. 7D:

COMBINE MTERIAL-1 CHANNEL-1 @ 13:15:30:00    (30)

When the command shown in the above (30) is input, the gateway 100 performs a search through the database at first and specifies the line control device, the port numbers of the device having the material-1 and the line control device to which it is connected, and the port number of the line control device corresponding to the channel-1.

At this time, the port number of the controlled device 104-3 for reproducing the material-1 is the Port-1. Further, the port number of the channel-1 of the controlled device 104-4, that is, the line control device, is the Port-2.

The controlled device 104-4 is controlled by the IDC 102-2, therefore the gateway 100 outputs the command shown in the following (31) to the IDC 101 as shown in FIG. 7E:

COMBINE IDC 102-2 CONTROLLED DEVICE 104-4 PORT-1
    PORT-2 @ 13:15:30:00    (31)

The IDC 101 which inputs the command shown in above (31) sets the timer for the time such as 13:15:30:00 and registers the trigger. At this time, the trigger is determined to be Timer-2. Here, the reason why another trigger is registered even though the time is the same as the time at the previous PLAY command is that the IDC 101 cannot judge the link of these PLAY command and COMBINE command and therefore must treat them independently.

The IDC101 outputs the command shown in the following (32) to the IDC 102-2 as shown in FIG. 7F:

COMBINE CONTROLLED DEVICE 104-4 PORT-1 PORT-2 @
    TIMER-2    (32)

The IDC 102-2 makes preparations for executing the COMBINE command and awaits the input of the trigger Timer-2 from the IDC 101. The IDC 101 compares the time code input from the outside and the set time 13:15:30:00 of the timer and outputs the trigger Timer-2 to the IDC 102-2 as shown in FIGS. 7G and 7H when they coincide. The IDC 102-2 executes the previously prepared COMBINE command as shown in FIG. 7I when the trigger Timer-2 is input and has the controlled device 104-4 perform the line connection of the Port-2 of the channel-1 and the Port-1 of the controlled device 104-3.

An explanation will be made next of the case where the reproduction settings are changed from the reproduction of the material-1 to the reproduction of the material-2 before the reproduction of the material-1 is set by the processings shown in FIGS. 7A to 7F mentioned above and the reproduction processing of the material-1 is started. Namely, an explanation will be made of the processing where the settings for the reproduction of the material are changed from the material-1 to the material-2.

Figure 8:
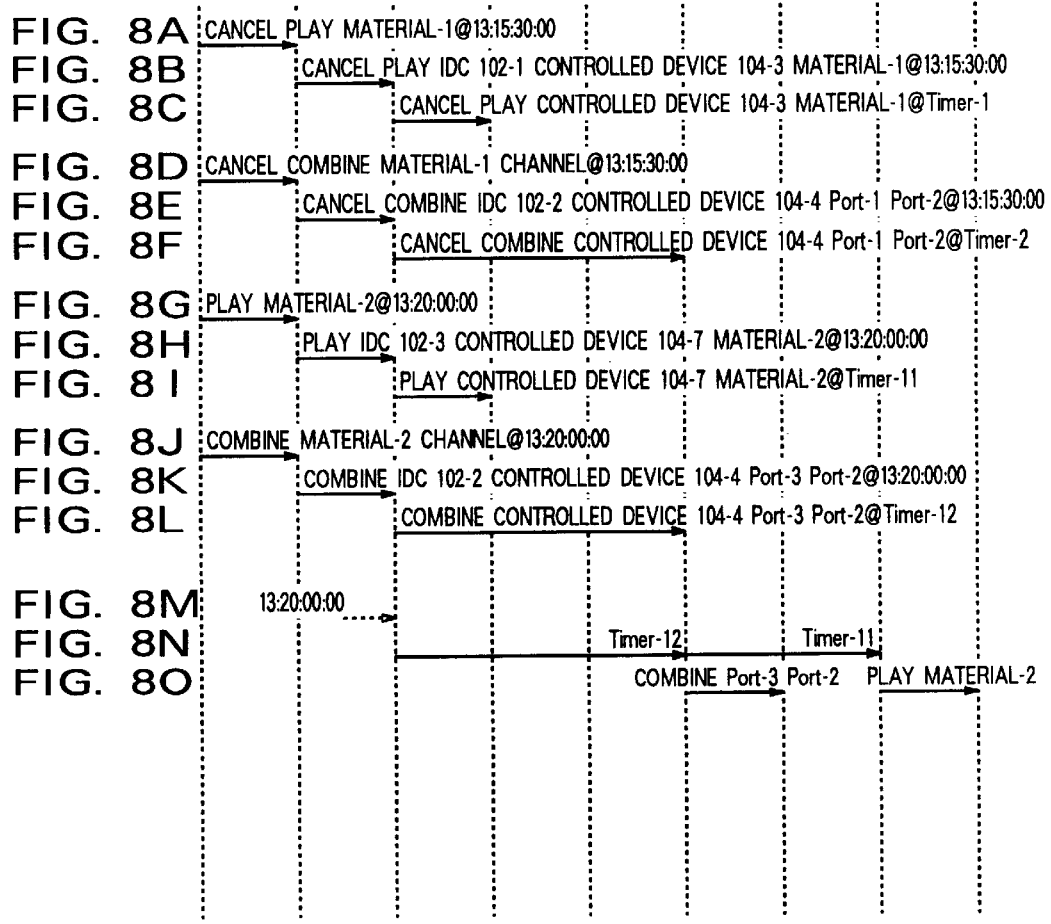
FIGS. 8A to 8O are a signal flow diagram for explaining the processing for setting up the reproduction of the material-2 by changing the setting for reproduction of the material-1 set in FIGS. 7A to 7I.

First, the reproduction (PLAY) command shown in the above (27), (28), and (29) performed in FIGS. 7A, 7B and 7C are invalidated by the "CANCEL PLAY" command as shown in FIGS. 8A, 8B and 8C. Further, the line control command (COMBINE) shown in the above (30), (31), and (32) performed in FIGS. 7D, 7E and 7F are invalidated by the "CANCEL COMBINE" command as shown in FIGS. 8D, 8E and 8F.

Then, as shown in FIGS. 8G and 8J, for the new material-2, the reproduction command and the line control command are output from the application 106. Here, the processings shown in FIGS. 8G to GL are similar to the processings shown in FIGS. 7A to 7F mentioned before.

In the reproduction of the material-2, the IDC 101 respectively outputs the triggers Timer-11 and Timer-12 to the IDC 102-3 and 02-2 as shown in FIG. 8N when the time code from the outside and the set time 13:15:30:00 coincide as shown in FIG. 8M.

The IDC 102-3 makes the controlled device 104-7 start the reproduction of the material-2 as shown in FIG. 8O when the trigger Timer-11 is input as shown in FIG. 8N. Further, the IDC 102-2 makes the controlled device 104-4 perform the line connection of the Port-3 and Port-2 as shown in FIG. 8O when the trigger Timer-12 is input as shown in FIG. 8N.

In the AV data processing control device of the present embodiment, when the reproduced material is changed from the material-1 to the material-2, the application 106 separately outputs the "CANCEL PLAY" command and "CANCEL COMBINE" command to the gateway 100 as shown in FIGS. 8A to 8D to invalidate the "PLAY" command and "COMBINE" command for the material-1 which have been already output. However, if the application 106 must output two CANCEL commands in this way, there is a possibility that omission may occur in the operation for invalidating the commands or an erroneous command may be invalidated. Particularly when there are many related commands, the issuance of the invalidating command is troublesome and easily causes a mistake.

Further, in the AV data processing control device of the present embodiment, as shown in FIGS. 8A to 8F, relatively many steps are necessary until all invalidating processings are ended for the reproduction processing of the material-1 and the time accompanying the invalidating processing is long. For this reason, the possibility of generation of a contact input during a period where the invalidating processing for the reproduction of the material-1 is carried out is high. For example, when a contact input is generated at the point of time when the processing shown in FIG. 8C is ended, the "PLAY" command shown in FIGS. 7A to 7C becomes invalid, but the "COMBINE" command shown in FIGS. 7D to 7F is executed. As a result, an unnecessary picture is sometimes output. Namely, a possibility of occurrence of an inconvenience where only part of the commands among the related commands is executed is high.

Fourth Embodiment

In the AV data processing control device of the present embodiment, the problems in the AV data processing control device of the third embodiment were solved by grouping together the commands which should be simultaneously executed and attaching an identifier ID to this set. Here, the set of the commands which should be simultaneously executed is referred to as a command group ComQ, and the ID of this ComQ is referred to as a QID.

Note that, the AV data processing control device of the present embodiment reproduces the material-1 at the prescribed time and outputs the same to the channel-1 by using a timer similar to the AV data processing control device of the third embodiment.

Below, an explanation will be made of the case where the processing for setting up the reproduction of the material-1 is performed by using the command group ComQ.

Figure 9:
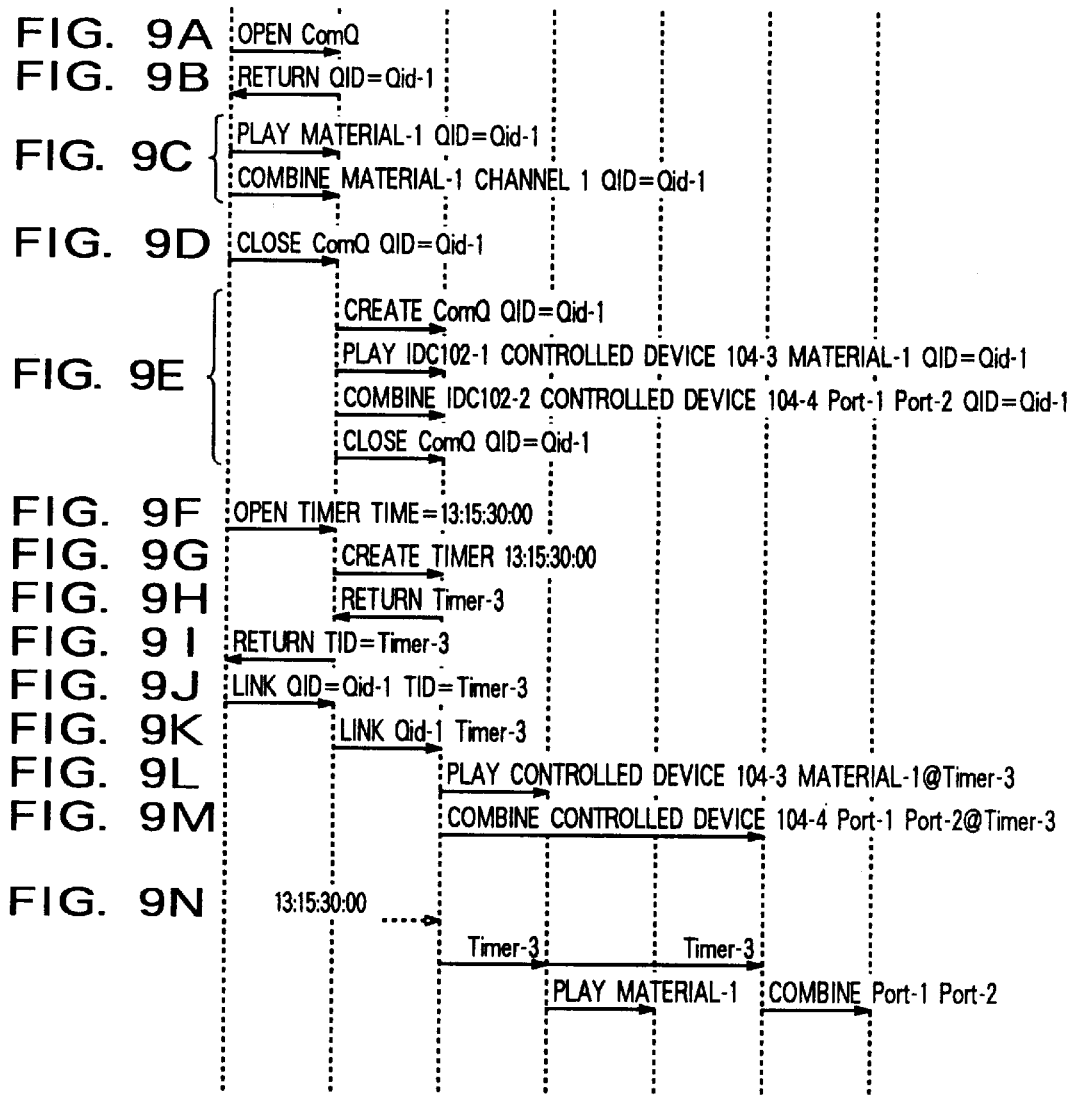
FIGS. 9A to 9N are a signal flow diagram for explaining the processing for setting up the reproduction of the material-1 in the AV data processing control device according to a fourth embodiment of the present invention.

First, the application 106 outputs the command shown in the following (33) to the gateway 100 as shown in FIG. 9(A) to instruct the preparation of the ComQ and obtains the QID.

OPEN COMQ (33)

The gateway 100 receiving the command shown in the above (33) secures the region of the ComQ in the internal portion and returns the QID thereof to the application 106. At this time, when QID is Qid-1, the gateway 100 returns the Qid to the application 106 by using the command shown in the following expression (34) as shown in FIG. 9B:

RETURN QID=QID-1 (34)

Thereafter, the application 106 clearly indicates which commands are to be grouped together by adding the Qid-1 received from the gateway 100 to the commands.

As in the present embodiment, when reproducing the material-1 and outputting it to the channel-1, as shown in FIG. 9C, it is sufficient so far as the application 106 outputs the commands shown in the following (35) and (36) to the gateway 100:

PLAY MATERIAL-1 QID=QID-1 (35)

COMBINE MATERIAL-1 CHANNEL-1 QID=QID-1 (36)

When the commands shown in the above (35) and (36) are input, the gateway 100 registers these two commands in the region of ComQ corresponding to Qid-1.

When the setting of the required commands is ended, the application 106 outputs the data indicating this, for example, the command shown in the following (37), to the gateway 100 as shown in FIG. 9D:

CLOSE COMQ QID=QID-1 (37)

The gateway 100 recognizes that the setting with respect to the ComQ is ended when the command shown in above (37) is input.

The gateway 100 can output the contents of the ComQ to the IDC 101 at this point of time or can output the same at the point of time when the time for start of execution of the ComQ is designated. Further, it is also possible for the gateway 100 to output the contents of ComQ to the IDC 101 whenever a command is input from the application 106.

The gateway 100 searches through the database prepared in advance and prepares the commands to be output to the IDC 101 based on the results of the search.

From the gateway 100 to IDC 101, as shown in for example FIG. 9E, the commands shown in the following (38) to (41) are output in the following order:

CREATE COMQ QID=QID-1 (38)

PLAY IDC 102-1 CONTROLLED DEVICE 104-3 MATERIAL-1 QID=QID-1 (39)

COMBINE IDC 102-2 CONTROLLED DEVICE 104-4 PORT-1 PORT-2 QID=QID-1 (40)

CLOSE COMQ QID=QID-1 (41)

When the commands shown in the above (38) to (41) are input, the IDC 101 stores these commands in the memory and awaits the designation of the trigger for executing this COmQ.

Next, the application 106 must designate the time for executing the command group ComQ. The designation of this time is carried out by outputting the command shown in the following (42) from the application 106 to the gateway 100 as shown in for example FIG. 9F. This command is for setting the monitoring operation so that the trigger is generated when the time becomes 13:15:30:00.

OPEN TIMER TIME=13:15:30:00 (42)

When the command shown in the above (42) is input, the gateway 100 outputs the timer generation command shown in the following (43) to the IDC 101 as shown in FIG. 9G:

CREATE TIMER 13:15:30:00 (43)

When receiving the command shown in the above (43), the IDC 101 sets the timer for the time 13:15:30:00 and registers the trigger. When the trigger at this time is defined as Timer-3, the IDC 101 outputs the command shown in the following (44) to the gateway 100 as shown in FIG. 9H and outputs the trigger ID to the gateway 100:

RETURN TIMER-3 (44)

Further, the gateway 100 further outputs the command shown in the following expression (45) to the application 106 as shown in FIG. 9I to transfer the trigger ID:

RETURN TID=TIMER-3 (45)

By this, the application 106 obtains the trigger ID.

The application 106 designates the execution timing of the ComQ by linking the input trigger ID and the command group ComQ which was previously prepared. The application 106 outputs the command shown in the following (46) to the gateway 100 as shown in for example FIG. 9J:

LINK QID=QID-1 TID=TIMER-3     (46)

The gateway 100 receiving the command shown in above (46) performs the linkage of the ComQ and TID also with respect to the IDC 101. For example, the gateway 100 outputs the command shown in the following (47) to the IDC 101 as shown in FIG. 9K:

LINK QID-1 TIMER-3     (47)

The IDC 101 which input the command shown in above (47) outputs the command to the IDC 102-1 and IDC 102-2 since the previously prepared ComQ and the trigger for execution this are linked. The IDC 101 outputs the command shown in the following expression (48) to the IDC 102-1 as shown in FIG. 9L:

PLAY CONTROLLED DEVICE 104-3 MATERIAL-1 @ TIMER-3     (48)

The IDC 102-1 makes the preparations for executing the PLAY command and awaits the input of the trigger Timer-3 from the IDC 101. The IDC 101 subsequently outputs the command shown in the following (49) to the IDC 102-2 as shown in FIG. 9M:

COMBINE CONTROLLED DEVICE 104-4 PORT-1 PORT-2 @ TIMER-3     (49)

The IDC 102-2 makes the preparations for executing the COMBINE command and awaits the input of the trigger Timer-3 from the IDC 101.

The IDC 101 compares the time code input from the outside and the set time 13:15:30:00 of the timer and, when they coincide, as shown in FIG. 9N, outputs the trigger Timer-3 to the IDC 102-1 and IDC 102-2.

The IDC 102-1, when the trigger Timer-3 is input, executes the previously prepared PLAY command and outputs the instruction for performing the reproduction of the material-1 to the controlled device 104-3 as shown in FIG. 9N. Simultaneously with this, the IDC 102-2 executes the previously prepared COMBINE command when the trigger Timer-3 is input and instructs connection of the lines of Port-1 and Port-2 with respect to the controlled device 104-4 as shown in FIG. 9N.

Next, an explanation will be made of the case where the reproduction time of the material-1 is changed to 13:20:00:00 before performing the reproduction of the material-1 after performing the setting for reproducing the material-1 at the time 13:15:30:00 by the processings shown in FIGS. 9A to 9M mentioned above.

At this time, it is sufficient so far as the application 106 changes only the timer. After this, it is possible to leave everything to the processings of the gateway 100 on.

Figure 10:
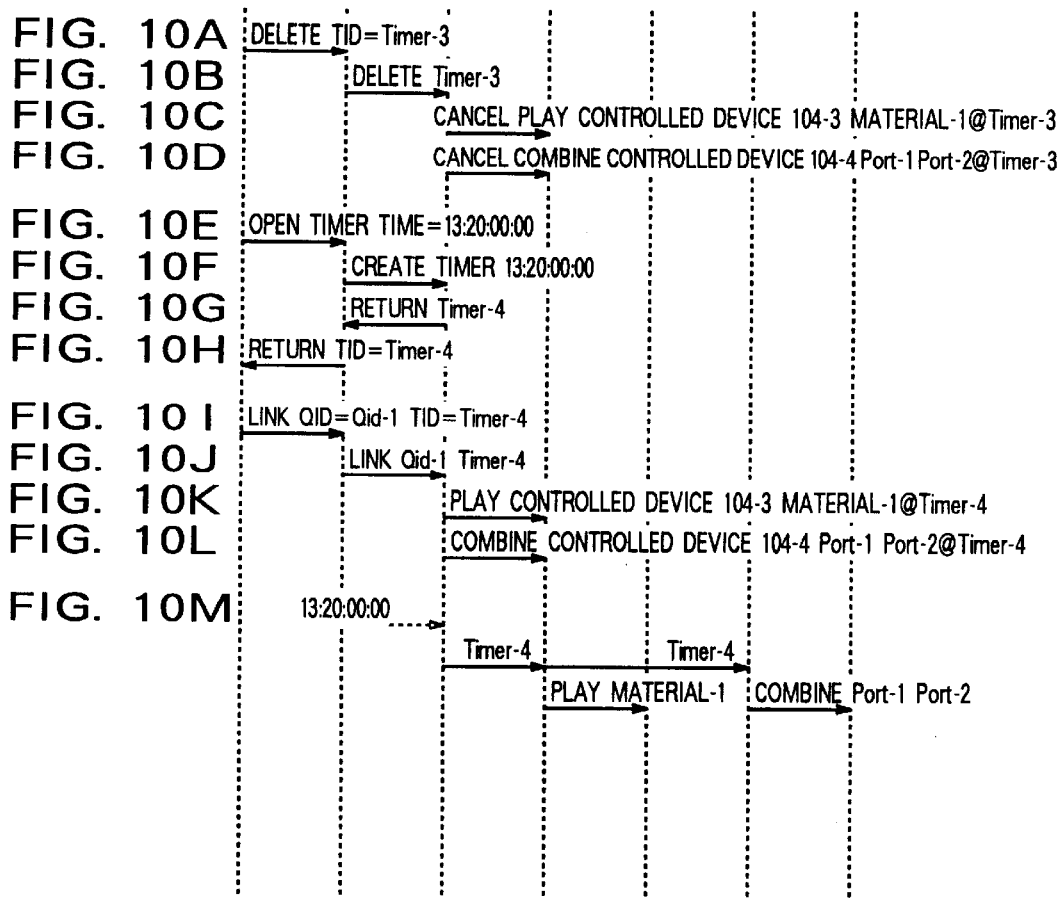
FIGS. 10A to 10M are a signal flow diagram for explaining the processing for setting up the reproduction of the material-2 by changing the setting for reproduction of the material-1 set in FIGS. 9A to 9N.

First, the application 106 outputs the command shown in the following (50) to the gateway 100 as shown in FIG. 10A so as to delete the previously prepared timer:

DELETE TID=TIMER-13     (50)

When the command shown in above (50) is input, the gateway 100 outputs the command shown in the following (51) for releasing the timer to the IDC 101 as shown in FIG. 10B:

DELETE TIMER-3     (51)

When the command shown in above (51) is input, the IDC 101 releases the timer. Accordingly, if the releasing command of the timer is in time at this point of time, the trigger Timer-3 shown in FIG. 9N is not output from the IDC 101 to the IDC 102-1 and IDC 102-2. Namely, none of the commands contained in the ComQ are executed. On the other hand, when this releasing command of timer was not in time, all commands contained in the ComQ will be executed. Accordingly, a series of complete contents linked by the ComQ are executed. For this reason, an operation such as a connection to a line which outputs nothing due to the execution of only part of the commands does not occur. By this, the demand that all related commands should be executed if they are to be executed at all is satisfied.

Next, the IDC 101 outputs the "CANCEL PLAY" command to the IDC 102-1 as shown in FIG. 10C to invalidate the PLAY command which has been already output to the IDC 102-1. Further, the IDC 101 outputs the "CANCEL COMBINE" command to the IDC 102-2 as shown in FIG. 10D to invalidate the COMBINE command which has been already output to the IDC 102-2.

The invalidation processing shown in FIGS. 10C and 10D is carried out under the control at the IDC 101 and subsequent devices. It is not necessary to wait for the command from the gateway 100 and devices upstream, therefore the processing is quickly carried out.

Next, the application 106 must designate a new time for executing the ComQ. The designation of this time is carried out by outputting the command shown in the following (52) from the application 106 to the gateway 100 as shown in for example FIG. 10E. This command is for setting the monitoring operation so that the trigger is generated when the time becomes 13:20:00:00.

OPEN TIMER TIME=13:20:00:00     (52)

The processings of FIGS. 10F to 10H performed after FIG. 10E are similar to the processings of FIGS. 9G to 91.

Next, the application 106 performs the processing shown in FIGS. 10I to 10L so as to link the command group ComQ of the material-1 and the time 13:20:00:00 for newly performing the reproduction of the material-1 to link the newly prepared timer and the ComQ of the material-1. Here, the processings of FIGS. 10I to 10L are respectively the same as the processings of FIGS. 9J to 9M except the set time of the timer becomes 13:20:00:00 and the trigger thereof becomes Timer-4.

At this time, in the reproduction of the material-1, the IDC 101 outputs the trigger Timer-14 from the IDC 101 to the IDC 102-1 and 102-2 at the time 13:20:00:00 as shown in FIG. 10M.

The IDC 102-1 makes the controlled device 104-3 perform the reproduction of the material-2 when the trigger Timer-4 is input as shown in FIG. 10M. Further, the IDC 102-2 makes the controlled device 104-4 perform the line connection of the Port-1 and Port-2 when the trigger Timer-4 is input as shown in FIG. 10M.

Figure 11:
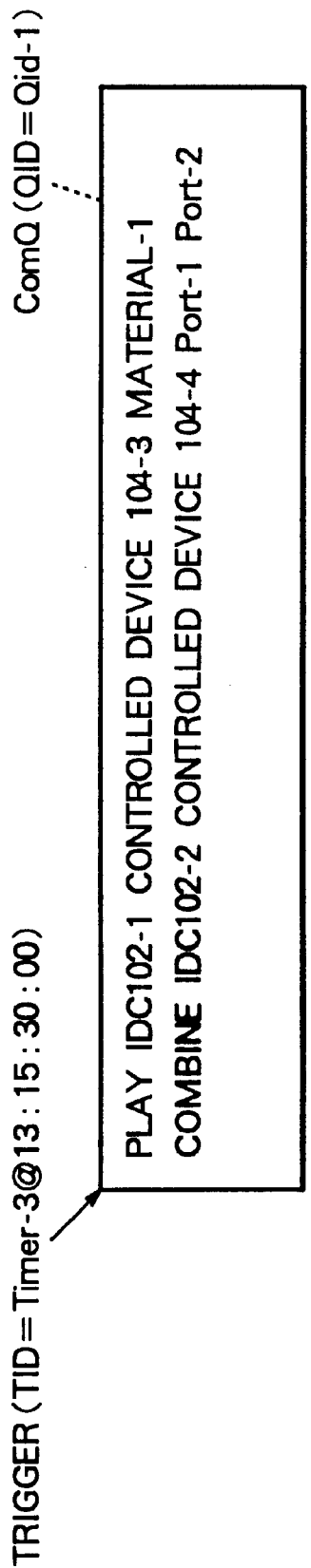
FIG. 11 is a view for explaining the concept of the command group in the AV data processing control device according to the fourth embodiment of the present invention.

Namely, the AV data processing control device of the present embodiment, as shown in FIG. 11, registers the PLAY command and the COMBINE command as the command group ComQ of the identifier Qid-1 and instructs the start of execution of this ComQ by the trigger Timer-3.

According to the AV data processing control device of the present embodiment explained above, at a relatively early timing, that is, at a timing where the DELETE command of the above (51) shown in FIG. 10B is output to the IDC 101, it is determined whether or not the change of settings is in time. Therefore the decision of whether or not that change is in time is easy when the user changes the settings.

Further, according to the AV data processing control device of the present embodiment, all related commands are invalidated if that change in settings is in time, and when the change of settings is not in time, all related commands are executed. For this reason, a situation where only part of the commands is executed can be avoided.

Further, according to the AV data processing control device of the present embodiment, when the command shown in the above (50) shown in FIG. 10A is output from the application 106, all commands related to the reproduction goof the material-1 can be invalidated, therefore a possibility of omission of a command for invalidation or error becomes low. This is particularly effective where there are many related commands.

Fifth Embodiment

The AV data processing control device of the present embodiment performs the processing for setting up the reproduction of the material-1 and the processing for setting up the reproduction of the material-2 which is continuously reproduced subsequent to the material-1.

Namely, in this AV data processing control device, the material-2 is continuously reproduced after the reproduction of the material-1. Here, the reproduction of the material-1 is carried out by using a contact input as a trigger.

First, an explanation will be made of the processing for setting up the reproduction of the material-1.

The processing for setting up the reproduction of the material-1 is shown in FIGS. 12A to 12F.

First, the command shown in the following (53) is output from the application 106 shown in FIG. 1 to the gateway 100 as shown in FIG. 12A:

PLAY MATERIAL-1 @ CONTACT INPUT-1 (53)

The gateway 100 searches through its own database when the command shown in the above (53) is input and specifies in which controlled device 104-m the material-1 exists. For example, assume that the material-1 exists in the controlled device 104-3. It is seen that this controlled device 104-3 is controlled by the IDC 102-1.

The gateway 100 outputs the command shown in the following (54) to the IDC 101 as shown in FIG. 12B:

PLAY CONTROLLED DEVICE 104-3 MATERIAL-1 @ CONTACT INPUT-1 (54)

The IDC 101 which inputs the command shown in above (54) sets a monitoring operation for the contact input-1 and registers the trigger. At this time, where the registered trigger is Gpi-1, as shown in FIG. 12C, the gateway 100 outputs the command shown in the following (55) to the IDC 102-1:

PLAY IDC 102-1 CONTROLLED DEVICE 104-3 MATERIAL-1 @ GPI-1 (55)

The IDC 102-1 makes the preparation for executing the PLAY command when the command of the above (55) is input and awaits the input of the trigger Gpi-1 from the IDC 101. The IDC 101 outputs the trigger Gpi-1 to the IDC 102-1 as shown in FIG. 12H when the contact input-1 is input as shown in FIG. 12G. The IDC 102-1 executes the previously prepared PLAY command as shown in FIG. 12I when the trigger Gpi-1 is input and reproduces the material-1 from the controlled device 104-3.

Here, to output the reproduced video and audio data to a required channel, it is necessary to switch the line simultaneously with the reproduction. For this reason, it is necessary to send the line switching command to the IDC 101 together with the reproduction command from the application 106.

The application 106 outputs the command shown in the following (56) to the gateway 100 as shown in FIG. 12D:

COMBINE MATERIAL-1 CHANNEL-1 @ CONTACT INPUT-1 (56)

The gateway 100 first performs the search of the database when the command shown in the above (56) is input and specifies the port numbers of the line control device, the device in which the material-1 exists, and the line control device to which this device is connected and the port number of the line control device corresponding to the channel-1.

For example, when this line control device is the controlled device 104-4, the port number of the channel-1 thereof is Port-2. Also, the port number of the controlled device 104-3 for reproducing the material-1 is Port-1. At this time, the controlled device 104-4 is controlled by the IDC 102-2, therefore the gateway 100 outputs the command shown in the following (57) to the IDC 101 as shown in FIG. 12E.

COMBINE IDC 102-2 CONTROLLED DEVICE 104-4 PORT-1 PORT-2 @ CONTACT INPUT-1 (57)

The IDC 101 which inputs the command shown in above (57) sets up the monitoring operation for the contact input-1 and registers Gpi-2 as the trigger. Here, the reason why another trigger is registered even though the contact input is the same as that at the previous PLAY command is that the IDC 101 cannot judge the connection of these PLAY command and COMBINE command and therefore must treat them independently.

The IDC 101 outputs the command shown in the following (58) to the IDC 102-2 as shown in FIG. 12F:

COMBINE CONTROLLED DEVICE 104-4 PORT-1 PORT-2 @ GPI-2 (58)

The IDC 102-2 makes the preparations for executing the COMBINE command when the command shown in the above (58) is input and awaits the input of the trigger Gpi-2 from the IDC 101. The IDC 101 monitors the contact input-1 and, as shown in FIG. 12G, when there is the contact input-1, as shown in FIG. 12H, outputs the trigger Gpi-2 to the IDC 102-2. The IDC 102-2, when the trigger Gpi-2 is input, as shown in FIG. 12I, executes the previously prepared COMBINE command and has the controlled device 104-4 perform the line connection of the Port-1 and the Port-2. Here, the output timings of the trigger Gpi-1 and trigger Gpi-2 by the IDC 101 are the same.

In the present embodiment, the reproduction of the material-2 is carried out after the reproduction of the material-1. At this time, the reproduction time of the material-2 is determined from the time of start of the reproduction and the reproduction time of the material-1 and the reproduction command and the line control command are set for the material-2.

For example, the IDC 101 outputs the time for start of the reproduction of the material-1 to the gateway 100. At this time, the IDC 101 inputs the contact input-1 in FIG. 12G and outputs the time for outputting the trigger Gpi-2 to the IDC 102-2 to the gateway 100.

For example, when the time for start of reproduction of the material-1 is 13:15:00:00, the IDC 101 outputs the command shown in the following (59) to the gateway 100 in FIG. 12I:

RETURN GPI-2 13:15:00:00 (59)

When the command shown in above (59) is input, the gateway 100 outputs the command shown in the following

(60) to the application 106 as shown in FIG. 12J and sends the time for start of the reproduction of the material-1 to the application 106:

RETURN TID=GPI-2 WHEN=13:15:00:00  (60)

Here, when the reproduction time of the material-1 is 00:00:30:00, the application 106 determines the time for start of the reproduction of the material-2 to 13:15:30:00 from this reproduction time of the material-1 and the time for start of the reproduction of the material-1.

Next, the application 106 outputs the command shown in the following (61) to the gateway 100 as shown in FIG. 12K:

PLAY MATERIAL-2 @ 13:15:30:00  (61)

Here, the gateway 100 searches through its own database and specifies in which controlled device 104-$m$ the material-2 exists. For example, when it exists in the controlled device 104-7, it is seen that this controlled device 104-7 is controlled by the IDC 102-3. Therefore, as shown in FIG. 12L, the gateway 100 outputs the command shown in the following (62) to the IDC 101:

PLAY IDC 102-3 CONTROLLED DEVICE 104-7 MATERIAL-2
  @ 13:15:30:00  (62)

The IDC 101 sets the timer for the time 13:15:30:00 when the command shown in the above (62) is input and registers the trigger. When the trigger at this time is defined as the Timer-1, the IDC 101 outputs the command shown in the following (63) to the IDC 102-3 as shown in FIG. 12M:

PLAY CONTROLLED DEVICE 104-7 MATERIAL-2 @ TIMER-
  11  (63)

When the command shown in the above (63) is input, the IDC 102-3 makes the preparations for executing the PLAY command and awaits the input of the trigger Timer-1 from the IDC 101. The IDC 101 compares the externally input time code and the set time 13:15:30:00 of the timer and, when they become the same value, outputs the trigger Timer-1 to the IDC 102-3 as shown in FIG. 12Q. When the IDC 102-3 inputs the trigger Timer-1, it executes the previously prepared PLAY command and has the controlled device 104-7 carry out the reproduction of the material-2.

Here, to output the reproduced video and audio data to the required channel, it is necessary to switch the line simultaneously with the reproduction. For this reason, it is necessary to output the line switching command to the gateway 100 together with the reproduction command from the application 106. Namely, the application 106 outputs the command shown in the following (64) to the gateway 100 as shown in FIG. 12N:

COMBINE MATERIAL-2 CHANNEL-1 @ 13:15:30:00  (64)

When the command shown in above (64) is input, the gateway 100 first performs a search through the database and specifies the port numbers of the line control device, the device for reproducing the material-2, and the line control device to which it is connected and the port number of the line control device corresponding to the channel-1. At this time, for example the line control device is the controlled device 104-4 and the port number of the channel-1 thereof is Port-2. Further, the port number of the controlled device 104-7 reproducing the material-2 is the Port-3. Further, the controlled device 104-4 is controlled by the IDC 102-2, therefore, as shown in FIG. 12O, the gateway 100 outputs the command shown in the following (65) to the IDC 101:

COMBINE IDC 102-2 CONTROLLED DEVICE 104-4 PORT-3,
  PORT-2 @ 13:15:30:00  (65)

The IDC 101 sets the timer for the time 13:15:30:00 and registers the same as the trigger. The trigger at this time is defined as Timer-2. Here, the reason why another trigger is registered even though the time is the same as the time at the previous PLAY command is that the IDC 101 cannot judge if there is a connection between these commands and therefore must treat them independently. The IDC101 outputs the command shown in the following (66) to the IDC 102-2 as shown in FIG. 12P:

COMBINE CONTROLLED DEVICE 104-4 PORT-3 PORT-2 @
  TIMER-2  (66)

The IDC 102-2 makes the preparations for executing the COMBINE command and awaits the input of the trigger Timer-2 from the IDC 101. The IDC 101 compares the time code input from the outside and the set time 13:15:30:00 of the timer and, as shown in FIG. 12Q, outputs the trigger Timer-2 to the IDC 102-2 as shown in FIGS. 7G and 7H when they coincide. The IDC 102-2, when the trigger Timer-2 is input, executes the previously prepared COMBINE command and has the controlled device 104-4 perform the line connection of the Port-3 and the Port-2.

Here, the output timings of the trigger Timer-1 and trigger Timer-2 by the IDC 101 are the same.

Next, an explanation will be made of the processing where the material to be reproduced is changed from the material-1 to the material-3 before inputting the contact input-1 in FIG. 12G after performing the setting of the continuous reproduction processing of the material-1 and the material-2 by the setting processing shown in FIG. 12 by referring to FIG. 13.

First, the reproduction (PLAY) command of the material-1 shown in the above (53), (54), and (55) performed in FIGS. 12A, 12B, and 12C is invalidated by the "CANCEL PLAY" command as shown in FIGS. 13A, 13B, and 13C. Further, the line control command (COMBINE) shown in the above (56), (57), and (58) performed in FIGS. 12D, 12E, and 12F is invalidated by the "CANCEL COMBINE" command as shown in FIGS. 13D, 13E, and 13F.

Then, as shown in FIGS. 13G to 13L, the reproduction command and the line control command for the new material-3 are output from the application 106. Here, the processing shown in FIGS. 13G to 13L is similar to the processing shown in FIGS. 12A to 12F mentioned before. Here, the material-3 is reproduced by the controlled device 104-6 shown in FIG. 1, and the line control device is the controlled device 104-4.

In the reproduction of the material-3, when the contact input-1 is input as shown in FIG. 13M, the IDC 101 respectively outputs the triggers Gpi-11 and Gpi-12 to the IDC 102-3 and 102-2 as shown in FIG. 13N.

The controlled device 104-6 performs the reproduction of the material-3 when the trigger Gpi-11 is input to the IDC 102-3 as shown in FIG. 13O. The controlled device 104-4 performs the connection of the Port-4 and the Port-2 when the trigger Gpi-12 is input to the IDC 102-2 as shown in FIG. 13O.

Further, in the present embodiment, similar to the case shown in FIG. 12, the reproduction time of the material-2 is determined from the time for start of the reproduction and reproduction time of the material-3, and the reproduction command and the line control command are set for the material-2.

This processing is shown in FIGS. 13O to 13V. The processing of FIGS. 13O to 13V is similar to the processing of FIGS. 12I to 12P. The time for start of the reproduction of the material-3, however, is 13:15:00:00, and the reproduction time of the material-3 is 00:00:45:00.

In the AV data processing control device of the present embodiment, when the reproduction material is changed from the material-1 to the material-2, the application 106 separately outputs the "CANCEL PLAY" command and "CANCEL COMBINE" command to the gateway 100 as shown in FIGS. 13A and 13B to invalidate the "PLAY" command and "COMBINE" command for the material-1 which have been already output. However, if the application 106 must output two CANCEL commands in this way, there is a possibility that an omission will occur in the operation for invalidating the command and an erroneous command will be invalidated. Particularly when there are many related commands, the generation of the invalidation command is troublesome and a mistake is apt to occur.

Further, in the AV data processing control device of the present embodiment, as shown in FIGS. 13A to 13F, relatively many steps are required until all invalidation proceedings are ended for the reproduction processing of the material-1 and the time accompanying the invalidating processing is long. For this reason, the possibility of generation of a contact input during a period where the invalidating processing for the reproduction of the material-1 is performed is high. For example, if a contact input is generated at the point of time when the invalidating processing shown in FIG. 13C is ended, the "PLAY" command shown in FIGS. 12A to 12C becomes invalid, but the "COMBINE" command shown in FIGS. 12D to 12F is executed. As a result, an unrequired picture is sometimes output. In this way, a possibility of occurrence of the inconvenience that only part of the commands among the related commands is executed is high.

Sixth Embodiment

In the AV data processing control device of the present embodiment, the problems in the AV data processing control device of the fifth embodiment were solved by grouping together the commands which should be simultaneously executed and attaching an identifier ID to this set. Here, the set of the commands which should be simultaneously executed is referred to as a command group ComQ, and ID of this ComQ is referred to as a QID.

In this AV data processing control device of the present embodiment, an explanation will be made of the case where the processing for setting up the reproduction of the material-1 and the processing for setting up the reproduction of the material-2 which is continuously reproduced subsequent to the material-1 are carried out similar to the fifth embodiment mentioned before. Namely, in this AV data processing control device, subsequent to the reproduction of the material-1, the material-2 is continuously reproduced. Here, the reproduction of the material-1 is carried out by using a contact input as a trigger.

First, an explanation will be made of the case where the processing for setting up the reproduction of the material-1 is performed by using the command group ComQ. The application 106 outputs the command shown in the following (67) to the gateway 100 as shown in FIG. 14A to instruct the preparation of the ComQ concerning the material-1 and obtains the QID:

OPEN COMQ    (67)

The gateway 100 receiving the command shown in above (67) secures the region of the ComQ in the internal portion and returns the identifier QID thereof to the application 106. At this time, when the QID is Qid-1, the gateway 100 returns the Qid-1 to the application 106 by using the command shown in the following expression (68) as shown in FIG. 14B:

RETURN QID=QID-1    (68)

Thereafter, the application 106 clearly indicates which commands are to be grouped together by adding the Qid-1 received from the gateway 100 to the commands.

As in the present embodiment, when performing the setting for reproducing the material-1 and outputting this to the channel-1, as shown in FIG. 14C, it is sufficient so far as the application 106 outputs the commands shown in the following (69), (70), and (71) to the gateway 100:

PLAY MATERIAL-1 QID=QID-1    (69)

COMBINE MATERIAL-1 CHANNEL-1 QID=QID-1    (70)

DURATION VAL=0:00:30:00 QID=QID-1    (71)

When the commands shown in the above (69), (70), and (71) are input, the gateway 100 registers these three commands in the region of ComQ corresponding to Qid-1.

Here, the DURATION command is a command which designates the time for which the ComQ concerning the material-1 continues, sets the countdown timer in the IDC 101, and generates a trigger indicating that the ComQ is ended when the predetermined time has elapsed.

When the setting of the required command is ended, the application 106 outputs the data indicating this, for example, the command shown in the following (72), to the gateway 100 as shown in FIG. 14D:

CLOSE COMQ QID=QID-1    (72)

The gateway 100 recognizes that the setting with respect to the ComQ is ended when the command shown in above (72) is input.

The gateway 100 can output the contents of the ComQ to the IDC 101 at this point of time or can output the same at the point of time when the time for start of the execution of the ComQ is designated. Further, it is also possible for the gateway 100 to output the contents of the ComQ to the IDC 101 whenever a command is input from the application 106.

The gateway 100 searches through the database prepared in advance and prepares the commands to be output to the IDC 101 based on the results of the search.

From the gateway 100 to IDC 101, as shown in for example FIG. 14E, the commands shown in the following (73) to (77) are output in the following order:

CREATE COMQ QID=QID-1    (73)

PLAY IDC 102-1 CONTROLLED DEVICE 104-3 MATERIAL-1 QID=QID-1    (74)

COMBINE IDC 102-2 CONTROLLED DEVICE 104-4 PORT-1 PORT-2 QID=QID-1    (75)

CD-TIMER-1 0:00:30:00 QID=QID-1    (76)

CLOSE COMQ QID=QID-1    (77)

When the commands shown in the above (73) to (77) are input, the IDC 101 stores these commands in the memory and awaits the designation of the trigger for executing this ComQ.

Next, the application 106 must designate the contact input for executing the ComQ concerning the material-1. The designation of this contact input is carried out by outputting the command shown in the following (78) from the application 106 to the gateway 100 as shown in for example FIG. 14F. This command is for generating a trigger when there is a contact input-1 and, at the same time, for setting the monitoring operation of the contact input-1.

OPEN GPITRIGGER GPI=CONTACT INPUT-1 (78)

When the command shown in the above (78) is input, the gateway 100 outputs the monitoring operation command of the contact input-1 shown in the following (79) to the IDC 101 as shown in FIG. 14G:

CREATE GPITRIGGER CONTACT INPUT-1 (79)

When receiving the command shown in the above (79), the IDC 101 sets the monitoring operation of the contact input-1 and registers the same as a trigger. When the trigger at this time is defined as Gpi-3, the IDC 101 outputs the command shown in the following (80) to the gateway 100 as shown in FIG. 14H to transfer the trigger ID to the gateway 100:

RETURN GPI-3 (80)

Further, the gateway 100 further outputs the command shown in the following expression (81) to the application 106 as shown in FIG. 14I to transfer the trigger ID:

RETURN TID=GPI-3 (81)

By this, the application 106 sets the monitoring operation of the contact input-1 and obtains the trigger ID thereof.

The application 106 designates the execution timing of the ComQ by linking the input trigger ID and the ComQ of the material-1 which was previously prepared. The application 106 outputs the command shown in the following (82) to the gateway 100 as shown in for example FIG. 14J:

LINK=QID-1 TID=GPI-3 (82)

The gateway 100 receiving the command shown in the above (82) performs the linking of the ComQ and TID also with respect to the IDC 101. For example, the gateway 100 outputs the command shown in the following (83) to the IDC 101 as shown in FIG. 14K:

LINK QID-1 GPI-3 (83)

The IDC 101 which inputs the command shown in the above (83) outputs the command to the IDC 102-1 and IDC 102-2 since the previously prepared ComQ and the trigger for execution this are linked. The IDC 101 outputs the command shown in the following expression (84) to the IDC 102-1 as shown in FIG. 14L:

PLAY CONTROLLED DEVICE 104-3 MATERIAL-1 @ GPI-3 (84)

The IDC 102-1 makes the preparations for executing the PLAY command and awaits the input of the trigger Gpi-3 from the IDC 101. The IDC 101 subsequently outputs the command shown in the following (85) to the IDC 102-2 as shown in FIG. 14M:

COMBINE CONTROLLED DEVICE 104-4 PORT-1 PORT-2 @ GPI-3 (85)

The IDC 102-2 makes the preparations for executing the COMBINE command and awaits the input of the trigger Gpi-3 from the IDC 101.

The IDC 101 monitors the contact input-1 and, when there is an input of the contact input-1, as shown in FIG. 15J, outputs the trigger Gpi-3 to the IDC 102-1 and IDC 102-2. The IDC 101 activates the countdown timer at the timing for outputting the trigger Gpi-3 and generates the (CD-TIMER) indicating the ending of the ComQ as shown in FIG. 15K after the time 0:00:30:00.

The IDC 102-1, when the trigger Gpi-3 is input, executes the previously prepared PLAY command and outputs the instruction for performing the reproduction of the material-1 shown in the following expression (86) to the controlled device 104-3:

PLAY MATERIAL-1 (86)

Simultaneously with this, when the trigger Gpi-3 is input, the IDC 102-2 executes the previously prepared COMBINE command and outputs the instruction for connecting the lines of the Port-1 and Port-2 to the controlled device 104-4.

Next, an explanation will be made of the case where the processing for setting up the reproduction of the material-2 to be reproduced continuing after the material-1 is performed by using the command group ComQ.

FIGS. 15A to 15E show the processing for setting up the reproduction for the material-2. The processing of FIGS. 15A to 15E is similar to the processing of FIGS. 14A to 14E. Namely, in the processing for setting up the reproduction of the material-2, QID is Qid-2 and the reproduction time of the material-2 is 0:00:50:00. Further, the material-2 is reproduced by the controlled device 104-7. Also, the line control device is the controlled device 104-4 to which the Port-2 of the channel-1 and the Port-3 of the controlled device 104-7 are connected.

Next, an explanation will be made of the settings for performing the reproduction of the material-2 continuing after the reproduction of the material-1.

As shown in FIG. 15F, the application 106 outputs the command shown in the following (87) to the gateway 100. By this, it is designated that the Qid-2 is executed based on the ending of execution of Qid-1:

LINK QID=QID-2 TID=QID-1 (87)

When the above (87) is input, the gateway 100 recognizes that the ending of the Qid-1 is the execution start trigger of Qid-2 and outputs the command shown in the following (88) to the IDC 101 as shown in FIG. 15G:

LINK QID-2 QID-1 (88)

When the command shown in the above (88) is input, the IDC 101 outputs the command shown in the following (89) to the IDC 102-3 as shown in FIG. 15H:

PLAY CONTROLLED DEVICE 104-7 MATERIAL-2 @ QID-1 (89)

When the command shown in the above (89) is input, the IDC 102-3 monitors the input of the trigger Qid-1 and, when this trigger is input, controls the controlled device 104-7 and makes it start the reproduction of the material-2.

Further, when the command shown in above (88) is input, the IDC 101 outputs the command shown in the following (90) to the IDC 102-2 as shown in FIG. 15I:

COMBINE CONTROLLED DEVICE 104-4 PORT-3 PORT-2 @ QID-1 (90)

When the command shown in above (90) is input, the IDC 102-2 monitors the input of the trigger Qid-1 and, when this trigger is input, controls the controlled device 104-4 to make it perform the connection of the Port-3 and the Port-2.

When the command shown in above (88) is input, the IDC 101 starts the execution of Qid-2 based on the countdown timer of Qid-1.

Namely, the IDC 101 activates the countdown timer simultaneously with the output of the trigger Gpi-3 and, when the counting by this countdown timer is ended, as shown in FIG. 15(K), outputs the trigger Qid-1 to the IDC 102-2 and IDC 102-3.

When the trigger Qid-1 is input, the IDC 102-2 executes the previously set COMBINE command and has the controlled device 104-4 perform the line connection. When the trigger Qid-1 is input, the IDC 102-3 executes the previously set PLAY command and has the controlled device 104-7 perform the reproduction of the material-2.

Figure 18:
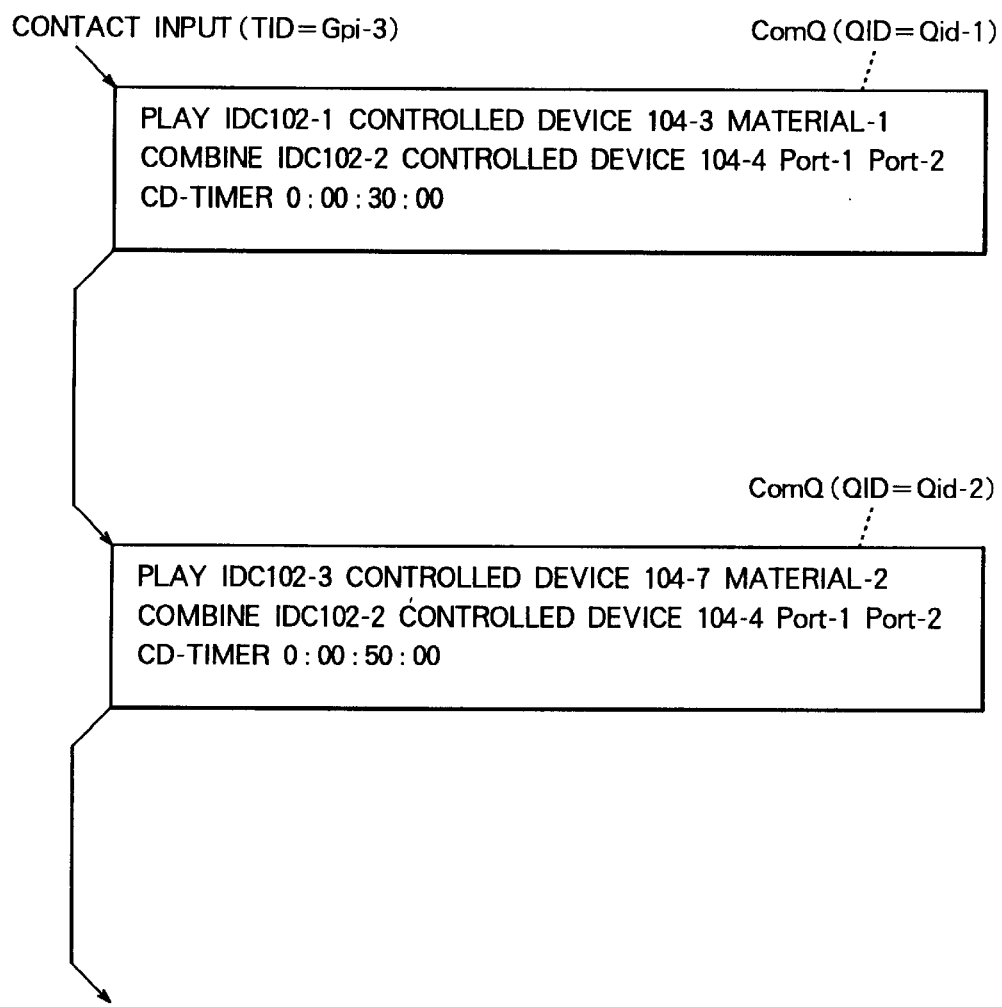
FIG. 18 is a view for explaining the concept of the command group in the AV data processing control device according to the sixth embodiment of the present invention.

Namely, the AV data processing control device of the present embodiment, as shown in FIG. 18, registers the PLAY command, the COMBINE command, and the CD-TIMER command concerning the material-1 as the command group ComQ of the identifier Qid-1 and instructs the start of execution of this command group ComQ by using the trigger Gpi-3 generated by the contact input-1.

Further, it registers the PLAY command, the COMBINE command, and the CD-TIMER command concerning the material-2 as the command group ComQ of the identifier Qid-2 and instructs the start of execution of this command group ComQ by the ending of the ComQ of the material-1.

Next, an explanation will be made of the case where "processing of performing the reproduction of the material-2 subsequent to the reproduction of the material-3" is set by changing the settings before performing the reproduction of the material-1 after setting "processing for performing the reproduction of the material-2 subsequent to the reproduction of the material-1" by the processing shown in FIG. 14 and FIG. 15 mentioned above.

At this time, the application 106 invalidates the link of the Qid-2 and Qid-1, newly prepares the ComQ for the material-3, and links this ComQ and Qid-2.

First, so as to invalidate the connection of the Qid-1 and contact input-1 previously performed, the application 106 outputs the command shown in the following (91) to the gateway 100 as shown in FIG. 16A:

UNLINK QID=QID-1 TID=GPI-3 (91)

When the command shown in the above (91) is input, the gateway 100 outputs the command shown in the following (92) for invalidating the link of Qid-1 and Gpi-3 to the IDC 101 as shown in FIG. 16B:

UNLINK QID-1 GPI-3 (92)

The IDC 101 invalidates the link of the Qid-1 and the contact input-1 when the command shown in the above (92) is input. Accordingly, after this point of time, even in a case where the contact input-1 is generated, the trigger Gpi-3 is not output from the IDC 101 to the IDC 102-1 and IDC 102-2. Namely, none of the commands contained in the Qid-1 are executed. On the other hand, if this invalidating command is not in time, all commands contained in the Qid-1 will be executed. Accordingly, a series of complete contents linked by the Qid-1 will be executed. For this reason, an operation such as connection to a line which outputs nothing due to the execution of only part of the commands does not occur. By this, the demand that all related commands should be executed if they are to be executed at all is satisfied.

Next, the IDC 101 outputs the "CANCEL PLAY" command to the IDC 102-1 as shown in FIG. 16C to invalidate the PLAY command which has been already output to the IDC 102-1. Further, the IDC 101 outputs the "CANCEL COMBINE" command to the IDC 102-2 as shown in FIG. 16D to invalidate the COMBINE command which has been already output to the IDC 102-2.

Here, it is also possible for the application 106 to invalidate the contents of the Qid-1 or link the Qid-1 to a contact input other than the contact input-1.

Next, the application 106 outputs the command shown in the following (93) to the gateway 100 as shown in FIG. 16E so as to invalidate the previously performed connection of the Qid-1 and Qid-2:

UNLINK QID=QID-2 TID=QID-1 (93)

The gateway 100 outputs the command shown in the following (94) for invalidating the link of Qid-2 and Qid-1 to the IDC 101 as shown in FIG. 16F when the command shown in the above (93) is input:

UNLINK QID-2 QID-1 (94)

The IDC 101 invalidates the link of the Qid-2 and Qid-1 when the command shown in the above (94) is input.

Next, the IDC 101 outputs the "CANCEL PLAY" command to the IDC 102-3 as shown in FIG. 16G to invalidate the PLAY command which has been already output to the IDC 102-3. Further, the IDC 101 outputs the "CANCEL COMBINE" command to the IDC 102-2 as shown in FIG. 16H to invalidate the COMBINE command which has been already output to the IDC 102-2.

Next, the application 106 newly prepares the ComQ of the material-3 and performs the processing for setting up the reproduction of the material-3. The processing for preparing for reproduction of the material-3 is shown in FIGS. 16I to 16M. The processing of FIGS. 16I to 16M is similar to the processing of FIGS. 14A to 14E except for the following point. Namely, in the processing for setting the reproduction of the material-3, QID is Qid-3, and the reproduction time of the material-3 is 0:00:45:00. Further, the material-3 is reproduced by the controlled device 104-6. Further, the line control device is the controlled device 104-4, and the port numbers to be connected are the Port-2 of the channel-1 and the Port-4 of the controlled device 104-6.

Next, to link the reproduction of the material-3 to the contact input-1, the processing shown in FIGS. 16N to 16Q is carried out.

The application 106 outputs the command shown in the following (95) to the gateway 100 as shown in for example FIG. 16N:

LINK QID=QID-3 TID=GPI-3 (95)

The gateway 100 receiving the command shown in above (95) links the, ComQ and TID of the material-3 with respect to the IDC 101. For example, the gateway 100 outputs the command shown in the following expression (96) to the IDC 101 as shown in FIG. 16O:

LINK QID-3 GPI-3 (96)

The IDC 101 which inputs the command shown in the above (96) outputs the command to the IDC 102-2 and IDC 102-3 since the previously prepared ComQ of the material-3 and the trigger for executing this are linked. The IDC 101 outputs the command shown in the following expression (97) to the IDC 102-3 as shown in FIG. 16P:

PLAY CONTROLLED DEVICE 104-6 MATERIAL-3 @ GPI-3  (97)

The IDC 102-3 makes the preparations for executing the PLAY command and awaits the input of the trigger register Gpi-3 from the IDC 101. The IDC 101, as shown in FIG. 14Q, subsequently outputs the command shown in the following (98) to the IDC 102-2:

COMBINE CONTROLLED DEVICE 104-4 PORT-4 PORT-2 @ GPI-3  (98)

The IDC 102-2 makes the preparations for executing the COMBINE command and awaits the input of the trigger register Gpi-3 from the IDC 101.

The IDC 101 monitors the contact input-1 and, when there is the input of the contact input-1, as shown in FIG. 17E, outputs the trigger Gpi-3 to the IDC 102-2 and IDC 102-3.

The IDC 102-3, when the trigger Gpi-3 is input, executes the previously prepared PLAY command and outputs the instruction for performing the reproduction of the material-3 to the controlled device 104-6. Simultaneously with this, the IDC 102-2 executes the previously prepared COMBINE command when the trigger Gpi-3 is input and outputs the instruction for connecting the lines of Port-3 and Port-2 to the controlled device 104-4.

Next, as shown in FIG. 17A, the application 106 outputs the command shown in the following (99) to the gateway 100. By this, it is designated that the Qid-2 is executed based on the ending of execution of the Qid-3:

LINK QID=QID-2 TID=QID-3  (99)

The gateway 100 recognizes that the ending of the Qid-3 is the execution start trigger of the Qid-2 when the above (99) is input and, as shown in FIG. 17B, outputs the command shown in the following (100) to the IDC 101:

LINK QID-2 QID-3  (100)

When the command shown in the above (100) is input, the IDC 101 outputs the command shown in the following (101) to the IDC 102-3 as shown in FIG. 17C:

PLAY CONTROLLED DEVICE 104-7 MATERIAL-2 @ QID-3  (101)

When the command shown in the above (101) is input, the IDC 102-3 monitors the input of the trigger Qid-3 and, as shown in FIG. 17(F), when the trigger Qid-3 is input, controls the controlled device 104-7 to make the same start the reproduction of the material-2.

Further, when the command shown in the above (100) is input, the IDC 101 outputs the command shown in the following (102) to the IDC 102-2 as shown in FIG. 17(D).

COMBINE CONTROLLED DEVICE 104-4 PORT-3 PORT-2 @ QID-3  (102)

When the command shown in the above (102) is input, the IDC 102-2 monitors the input of the trigger Qid-3 and, as shown in FIG. 17F, when the trigger Qid-3 is input, controls the controlled device 104-4 to make the same perform the connection of the Port-3 and Port-2.

When the command shown in the above (100) is input, the IDC 101 starts the execution of the Qid-2 based on the countdown timer of Qid-3.

Namely, the IDC 101 outputs the trigger Qid-3 to the IDC 102-2 and IDC 102-3 as shown in FIG. 17F when the counting by the countdown timer activated simultaneously with the output of the trigger Gpi-3 is ended. Note that, the IDC 101 activates the countdown timer at the timing of outputting the trigger Gpi-3 and generates the (CD-TIMER) indicating the ending of the ComQ of the material-3 as shown in FIG. 17F after the time 0:00:30:00.

When the trigger Qid-3 is input, the IDC 102-2 executes the previously set COMBINE command to make the controlled device 104-4 perform the line connection therein. When the trigger Qid-3 is input, the IDC 102-3 executes the previously set PLAY command to make the controlled device 104-7 perform the reproduction of the material-2 therein.

According to the AV data processing control device of the present embodiment explained above, at a relatively early timing, that is, at a timing that the UNLINK command of the above (92) shown in FIG. 16B is output to the IDC 101, it is determined whether or not the change of the setting is in time, and therefore the decision of whether or not the change is in time is easy when the user changes the settings.

Further, according to the AV data processing control device of the present embodiment, all linked commands are invalidated if that change of setting is in time, and when the change of setting is not in time, all related commands are executed. For this reason, a situation that only part of the command is executed can be avoided.

Further, according to the AV data processing control device of the present embodiment, when the command shown in the above (91) shown in FIG. 16A is output from the application 106, all commands related to the reproduction of the material-1 can be invalidated and therefore a possibility of omission of a command for invalidation or an error becomes low. This is particularly effective where there are many related commands.

Namely, according to the AV data processing control device of the present embodiment, even in a case where the setting for continuously performing the reproduction of the material-2 after the reproduction of the material-1 is changed to the setting for continuously performing the reproduction of the material-2 after the reproduction of the material-3, a possibility of occurrence of inconvenience is low.

Further, even in a case where the time for start of the reproduction is changed by the continuous reproduction using the timer, almost no change of the subsequent control for reproduction has to be made.

Seventh Embodiment

In the AV data processing control device of the present embodiment, similar to the above sixth embodiment, the processing for setting the reproduction of the material-1 and the processing for setting the reproduction of the material-2 which is continuously reproduced subsequent to the material-1 are carried out by grouping together the commands which should be simultaneously and attaching an identifier ID to this set. Namely, in this AV data processing control device, subsequent to the reproduction of the material-1, the material-2 is continuously reproduced. The reproduction of the material-1 is, however, carried out by using the timer.

The setting processing in the present embodiment is shown in FIG. 19 and FIG. 20. The processing shown in FIG. 19 and FIG. 20 is similar to the setting processing in the above sixth embodiment mentioned before by referring to FIG. 14 and FIG. 15 except for the following point. Namely, in the present embodiment, the reproduction of the material-1 is started at the time 13:15:30:00 by using the timer.

Accordingly, the processing shown in FIGS. 19A to 19E is the same as the processing shown in FIGS. 14A to 14E, but the processing shown in FIGS. 19F to 19M becomes the processing for setting the timer and generating the trigger Timer-3 at the time 13:15:30:00.

Further, the processing shown in FIGS. 20A to 20I and 20K is the same as the processing shown in FIGS. 15A to 15I and 15K, but the processing shown in FIG. 20J is to generate the trigger Timer-13 at the time 13:15:30:00 by the counting of the timer, and based on this trigger Timer-13, the processing of the controlled devices 104-4 and 104-7 is carried out.

Next, an explanation will be made of the case where the time for start of the reproduction of the material-1 is changed from the time 13:15:30:00 to a time 13:20:30:00 after the setting shown in FIG. 19 and FIG. 20 mentioned above is carried out.

In this case, first, as shown in FIG. 21A, the "UNLINK" command is output and the processing of FIGS. 21B to 21D is carried out to invalidate and the link of the reproduction of the material-1 and the trigger Timer-13 at the time 13:15:30:00.

Next, the processing shown in FIGS. 21E to 21H is carried out to generate the trigger Timer-13 for the time 13:20:00:00.

Next, the processing shown in FIGS. 21I tp 21L is carried out to link the trigger Timer-13 and the reproduction of the material-1.

By this, as shown in FIG. 21M, when the time 13:20:00:00 is detected by the timer, the trigger Timer-13 is output to the IDC 102-1 and 102-2, and in the controlled devices 104-3 and 104-4, the "PLAY" command and "COMBINE" command of the material-1 are respectively executed.

According to the AV data processing control device of the present embodiment, even in the case where the start of reproduction of the material-1 is set by a timer, an effect similar to that by the above sixth embodiment can be exhibited.

The present invention is not limited to the above embodiments. For example, the configuration of the AV data processing control device is not limited to that shown in FIG. 1 so far as it realizes the function shown in FIGS. 2 to 21 mentioned above.

Further, in the above embodiments, the case where the reproduction and the line control were carried out in the controlled device 104 was exemplified, but it is also possible for the controlled device 104 to perform other processing such as recording.

Further, in the above embodiment, as the linked commands, the "PLAY" command and "COMBINE" command were exemplified, but any type of the commands may be linked and also any number of commands may be linked.

As explained above, according to the AV data processing control device of the present invention and the method of the same, the procedure and processing for invalidating or changing all related commands become easy, and when the commands are invalidated or changed, the occurrence of omissions or errors in the procedure can be effectively prevented.

Further, according to the AV data processing control device of the present invention and the method of the same, when one group of linked commands is invalidated or changed, it becomes easy to decide whether or not the change is in time in relationship with the timing at which the commands are executed.

Further, according to the AV data processing control device of the present invention and the method of the same, none of the linked commands are executed if the invalidating processing of the commands is in time, while all of the linked commands are executed if it is not in time, therefore the execution of only part of the commands among the linked commands to cause output having no meaning does not occur.

What is claimed is:

1. A data processing control device for controlling a plurality of processing apparatuses processing at least one of video and audio data, comprising:

a command generating means for generating a plurality of control commands in which a common identifier is attached to a plurality of related commands and which instruct the control contents of the processing apparatuses and a link command for linking the identifier of a trigger generated by a contact input in accordance with a synchronization signal and the operation of an operating means and the identifier of the control commands;

an executing means for executing, when the trigger is generated said plurality of control commands containing the identifier related based on the link command are executed with respect to the trigger;

an invalidating means for inputting a link releasing command containing the identifier of the control commands and the identifier of the trigger and invalidating the link of the identifier of the control commands and the identifier of the trigger which has been already determined is invalidated based on the in-put link releasing command.

2. A data processing control device as set forth in claim 1, wherein the control commands are command instructing at least one of the recording and reproduction of the video and audio data and line connection.

3. A data processing control device as set forth in claim 1, wherein:

said executing means has a plurality of higher control units which generate a trigger when there is a contact input and a plurality of lower control units for respectively controlling one or more of the processing apparatuses based on the trigger from the higher control units.

4. A data processing control device as set forth in claim 3, wherein:

the higher control units output the identifier of the trigger contained in the link command and the contents of the control commands to the lower control units for executing the control commands containing the identifier contained in the link command when the link command is input and the lower control units execute the control commands when the trigger is input from the higher control units.

5. A data control method for controlling a plurality of processing apparatuses for processing at least one of the video and audio data, comprising the steps of:

inputting a plurality of control commands in which a common identifier is attached to a plurality of related commands and which instruct the control contents of the processing apparatuses and a link command for linking the identifier of a trigger generated by the contact input in accordance with a synchronization signal and the operation of an operating means and the identifier of the control commands executing said plurality of control commands containing the identifier related based on the link command with respect to the trigger when the trigger is generated;

inputting a link releasing command containing the identifier of the control commands and the identifier of the trigger; and inputting the link of the identifier of the control commands and the identifier of the trigger which has already determined based on the input link releasing command.

6. A data processing control method as set forth in claim 5, wherein the control commands are commands instructing at least one of the recording and reproduction of the video and audio data and line connection.

7. A data processing control device for controlling a plurality of processing apparatuses processing at least one of video and audio data, comprising:

a command generating means for generating a plurality of control commands in which a common identifier is attached to a plurality of related commands and which indicate the control contents of the processing apparatus and a link command for linking the identifier of a trigger generated with the count of a timer and a synchronization signal as the reference and the identifier of the control commands;

an executing means for executing, when the trigger is generated, said plurality of control commands containing the identifier related based on the link command with respect to the trigger;

an invalidating means for inputting a link releasing command containing the identifier of the control commands and the identifier of the trigger; and invalidating the link of the identifier of the control commands and the identifier of the trigger which has already determined based on the input link releasing command.

8. A data processing control device as set forth in claim 7, wherein the timer generates the trigger at a predetermined time.

9. A data processing control device as set forth in claim 7, wherein the control commands are command instructing at least one of the recording and reproduction of the video and audio data and line connection.

10. A data processing control device as set forth in claim 7, wherein said executing means has a plurality of higher control units which provide the timer and generate the trigger with the count of the timer as a reference; and a plurality of lower control units which respectively control one or more of the processing apparatuses based on the trigger from the higher control units.

11. A data processing control device as set forth in claim 10, wherein:

the higher control units output the identifier of the trigger contained in the link command and the contents of the control commands to the lower control units for executing the control commands containing the identifier contained in the link command when the link command is input and the lower control units execute the control commands when the trigger is input from the higher control units.

12. A data control method for controlling a plurality of processing apparatuses for processing at least one of the video and audio data, comprising the steps of:

inputting a plurality of control commands in which a common identifier is attached to a plurality of related commands and which instruct the control contents of the processing apparatus and a link command for linking the identifier of a trigger generated with the count of a timer and a synchronization signal as the reference and the identifier of the control commands executing said plurality of control commands containing the identifier related based on the link command with respect to the trigger when the trigger is generated;

inputting a plurality of control commands in which a common identifier is attached to related commands and which instruct the control contents of the processing apparatus and a link command for linking the identifier of a trigger generated with the count of a timer as the reference and the identifier of the control commands; and executing a plurality of control commands containing the identifier related based on the link command with respect to the trigger when the trigger is generated.

13. A data processing control method as set forth in claim 12, wherein the control commands are commands instructing at least one of the recording and reproduction of the video and audio data and line connection.

14. A data processing control device for controlling a plurality of processing apparatuses which process at least one of video and audio data so as to continuously reproduce second material subsequent to first material, comprising:

an input means for inputting a plurality of control commands containing a plurality of control commands concerning the first material which indicate the control contents of the processing apparatuses and to which a first identifier is attached, a plurality of control commands concerning the second material to which a second identifier is attached, and a link command for linking the identifier of a first trigger and the first identifier of the plurality of control commands and linking the identifier of a second trigger and the second identifier of the plurality of control commands wherein the input means inputs a link releasing command containing the identifier of the control commands and the identifier of the trigger;

a trigger generating means for generating the second trigger at a time determined based on a time of generation of the first trigger and a reproduction time of the first material and a synchronization signal; and a command executing means for executing the plurality of control commands containing the identifier linked to the identifier of the first trigger when the first trigger is generated and executing the plurality of control commands linked to the identifier of the second trigger when the second trigger is generated wherein the command executing means invalidates the link of the identifier of the control commands and the identifier of the trigger which has been already determined based on the input link releasing command.

15. A data processing control device as set forth in claim 14, wherein the first trigger is generated by a contact input in accordance with an operation of an operating means.

16. A data processing control device as set forth in claim 14, wherein the first trigger is generated with a count of a timer as a reference.

17. A data processing control device as set forth in claim 16, wherein the timer generates the first trigger at a predetermined time.

18. A data processing control device as set forth in claim 14, wherein:

when changing the reproduction of the first material to the reproduction of a third material, the input means inputs the link releasing command containing the first identifier of the control commands and the identifier of the first trigger, a plurality of control commands concerning the third material to which a third identifier is attached, and a link command for linking the identifier of the first trigger and the third identifier of the control commands;

the executing means invalidates the link of the first identifier of the control commands and the identifier of the first trigger and then links the third identifier of the control commands and the identifier of the first trigger; and the trigger generating means generates the second trigger at a time determined based on the time of generation of the first trigger and the reproduction time of the third material.

19. A data processing control device as set forth in claim 14, wherein the control commands are commands instructing at least one of a recording and reproduction of video and audio data and a line connection.

20. A data processing control device as set forth in claim 14, further comprising:

a plurality of higher control units which generate the first trigger and second trigger and a plurality of lower control units which respectively control one or more processing apparatuses based on the first trigger and the second trigger from the higher control units.

21. A data processing control device as set forth in claim 20, wherein:

the higher control units output the identifier of the trigger contained in the link command and contents of the control commands to the lower control units which execute the control commands containing the identifier contained in the link command when the link command is input and the lower control units execute the control commands when a trigger is input from the higher control units.

22. A data processing control method for controlling a plurality of processing apparatuses which process at least one of video and audio data so as to continuously reproduce a second material subsequent to a first material, comprising the steps of:

inputting a plurality of control commands including a plurality of control commands concerning the first material which indicate the control contents of the processing apparatuses and to which a first identifier is attached and a plurality of control commands concerning the second material to which a second identifier is attached and a link command for linking an identifier of a first trigger and the first identifier of the control commands and linking an identifier of a second trigger and the second identifier of the plurality of control commands;

generating the second trigger at a time determined based on the time of generation of the first trigger and the reproduction time of the first material and a synchronization signal;

executing the plurality of control commands containing the identifier linked to the identifier of the first trigger when the first trigger is generated and executing the control commands linked to the identifier of the second trigger when the second trigger is generated;

inputting a link releasing command containing the identifier of the control commands and the identifier of the trigger; and inputting the link of the identifier of the control commands and the identifier of the trigger which has already determined based on the input link releasing command.

23. A data processing control method as set forth in claim 22, wherein the first trigger is generated by a contact input in accordance with an operation of an operating means.

24. A data processing control method as set forth in claim 22, wherein the first trigger is generated with a count of a timer as a reference.

* * * * *